(12) United States Patent
Lewis

(10) Patent No.: US 12,465,152 B1
(45) Date of Patent: Nov. 11, 2025

(54) ACCESSORIES FOR USE WITH BED SHEET RETENTION SYSTEMS

(71) Applicant: Travis R. Lewis, Valdosta, GA (US)

(72) Inventor: Travis R. Lewis, Valdosta, GA (US)

( * ) Notice: Subject to any disclaimer, the term of this patent is extended or adjusted under 35 U.S.C. 154(b) by 0 days.

(21) Appl. No.: 19/088,099

(22) Filed: Mar. 24, 2025

Related U.S. Application Data

(63) Continuation of application No. 19/078,995, filed on Mar. 13, 2025, which is a continuation-in-part of application No. 19/072,092, filed on Mar. 6, 2025, which is a continuation-in-part of application No. 18/986,848, filed on Dec. 19, 2024, which is a continuation of application No. 18/945,224, filed on Nov. 12, 2024.

(51) Int. Cl.
*A47C 21/02* (2006.01)

(52) U.S. Cl.
CPC .................. *A47C 21/022* (2013.01)

(58) Field of Classification Search
CPC ........ A61L 9/12; A61L 9/04; Y10T 24/44043; Y10T 24/4406; Y10T 24/23; A47C 21/028; A47C 21/024; A47C 21/02; A47C 21/022

See application file for complete search history.

(56) References Cited

U.S. PATENT DOCUMENTS

| | | | |
|---|---|---|---|
| 959,763 A | 5/1910 | Lehr | |
| 2,103,244 A | 12/1937 | Briscoe | |
| 3,045,310 A | 7/1962 | Velinsky | |
| 3,372,407 A | 3/1968 | Weber, III | |
| 3,823,873 A | 7/1974 | Miller et al. | |
| 4,523,870 A * | 6/1985 | Spector | B60H 3/0028 239/57 |
| 4,541,137 A | 9/1985 | Murray | |
| 4,698,880 A | 10/1987 | Hamm | |
| 5,404,601 A | 4/1995 | O'Neill et al. | |
| 5,738,831 A | 4/1998 | Bethel | |
| 5,775,876 A | 7/1998 | Walker et al. | |
| 5,782,408 A | 7/1998 | Carter | |
| 6,080,367 A * | 6/2000 | Lin | A61L 9/12 239/57 |
| 6,883,192 B1 | 4/2005 | Rose et al. | |
| 7,070,172 B2 * | 7/2006 | Fabrega | A01M 1/2033 261/104 |
| D551,333 S * | 9/2007 | Wu | D23/366 |
| 7,467,428 B2 * | 12/2008 | Hanes | A47C 21/022 24/72.5 |
| D613,388 S * | 4/2010 | Koenig | D23/366 |
| 8,096,486 B2 * | 1/2012 | Wang | A61L 9/04 239/58 |
| D666,284 S * | 8/2012 | Robinson | D23/368 |
| 8,277,940 B2 * | 10/2012 | Desiderio | B32B 3/266 428/905 |
| 8,978,997 B2 | 3/2015 | Bergman et al. | |

(Continued)

FOREIGN PATENT DOCUMENTS

| | | |
|---|---|---|
| EP | 4144385 | 3/2023 |
| KR | 20-2010-0011048 | 11/2010 |

(Continued)

*Primary Examiner* — Jack W Lavinder
*Assistant Examiner* — Louis A Mercado

(57) ABSTRACT

Accessories that can be used with bed sheet retention devices are disclosed. Methods of making and using accessories that can be used with bed sheet retention devices are also disclosed.

18 Claims, 22 Drawing Sheets

(56) References Cited

U.S. PATENT DOCUMENTS

| | | | |
|---|---|---|---|
| D737,947 S * | 9/2015 | Dobler | D23/368 |
| 9,192,690 B2 * | 11/2015 | Zobele | A01M 1/2044 |
| 9,205,163 B2 * | 12/2015 | Westphal | A61L 9/12 |
| 9,775,441 B2 | 10/2017 | Burrill | |
| 10,010,642 B2 | 7/2018 | Westphal | |
| 11,059,353 B1 | 7/2021 | Bennett et al. | |
| 11,944,096 B2 | 4/2024 | Nyambo et al. | |
| 2002/0062524 A1 | 5/2002 | Vogland et al. | |
| 2003/0012680 A1 * | 1/2003 | Balsys | A61L 9/122 |
| | | | 422/123 |
| 2003/0202922 A1 * | 10/2003 | Farmer | A61L 9/12 |
| | | | 422/305 |
| 2005/0103880 A1 * | 5/2005 | Taite | A61L 9/12 |
| | | | 239/57 |
| 2005/0125903 A1 | 6/2005 | Tapanes | |
| 2008/0257978 A1 | 10/2008 | Marth et al. | |
| 2013/0175355 A1 | 7/2013 | Lackey et al. | |
| 2013/0266486 A1 * | 10/2013 | Wu | A61L 9/12 |
| | | | 422/123 |
| 2021/0356147 A1 * | 11/2021 | Basile | A61L 9/04 |
| 2022/0161635 A1 | 5/2022 | Reshetnyak | |
| 2023/0017278 A1 | 1/2023 | Piquer | |
| 2023/0067503 A1 | 3/2023 | Guggenheim | |

FOREIGN PATENT DOCUMENTS

| | | |
|---|---|---|
| KR | 20-2011-0010985 | 11/2011 |
| WO | 2009/079694 | 7/2009 |

* cited by examiner

ACCESSORIES FOR USE WITH BED SHEET RETENTION SYSTEMS

This application is being filed as a continuation patent application of, and claims the benefit of priority to, U.S. patent application Ser. No. 19/078,995 filed on Mar. 13, 2025 entitled "ACCESSORIES FOR USE WITH BED SHEET RETENTION SYSTEMS, AND METHODS OF MAKING AND USING THE SAME," which is a continuation-in-part patent application that claims the benefit of priority to U.S. patent application Ser. No. 19/072,092 filed on Mar. 6, 2025, and entitled "BED SHEET RETENTION SYSTEMS, SYSTEM COMPONENTS, AND METHODS OF MAKING AND USING THE SAME," which is a continuation-in-part patent application that claims the benefit of priority to U.S. patent application Ser. No. 18/986,848 filed on Dec. 19, 2024 and entitled "BED SHEET RETENTION SYSTEMS, SYSTEM COMPONENTS, AND METHODS OF MAKING AND USING THE SAME," which claims the benefit of priority to, U.S. patent application Ser. No. 18/945,224 filed on Nov. 12, 2024 and entitled "BED SHEET RETENTION SYSTEMS, SYSTEM COMPONENTS, AND METHODS OF MAKING AND USING THE SAME," the subject matter of both of which is hereby incorporated by reference in its entirety.

FIELD OF THE INVENTION

The present invention relates to accessories that can be used with bed sheet retention devices, methods of making accessories that can be used with bed sheet retention devices, and, and methods of using accessories that can be used with bed sheet retention devices.

BACKGROUND OF THE INVENTION (1) U.S. patent application Ser. No. 18/986,848 filed on Dec. 19, 2024 and entitled "BED SHEET RETENTION SYSTEMS, SYSTEM COMPONENTS, AND METHODS OF MAKING AND USING THE SAME," (2) U.S. patent application Ser. No. 18/945,224 filed on Nov. 12, 2024 and entitled "BED SHEET RETENTION SYSTEMS, SYSTEM COMPONENTS, AND METHODS OF MAKING AND USING THE SAME," and (3) U.S. patent application Ser. No. 19/072,092 filed on Mar. 6, 2025, and entitled "BED SHEET RETENTION SYSTEMS, SYSTEM COMPONENTS, AND METHODS OF MAKING AND USING THE SAME," the subject matter of all of which is hereby incorporated by reference in its entirety, describe bed sheet retention systems and devices that provide a number of advantages over prior sheet retention systems as discussed therein.

There is a need in the art for continued improvements in the art of (i) bed sheet retention systems, and (ii) accessories suitable for use with the bed sheet retention systems.

SUMMARY OF THE INVENTION

The present invention is directed to accessories that can be used with and connected to bed sheet retention devices, and systems that prevent bed sheets from slipping off of a bed, such as in the corners of a bed mattress and/or along a side edge of the bed.

Each accessory of the present invention may comprise: (a) at least one accessory connecting member, and (b) an accessory body connected to and extending from the at least one accessory connecting member, wherein the at least one accessory connecting member is configured to extend within and connect to (a) (i) one or more corner brackets, and/or (a) (ii) one or more side brackets of a bed sheet retention system, and/or (b) one or more sheet-engaging channels along an outer surface of (i) a mattress, and/or (ii) a mattress cover, and/or a mattress covering component.

The attachable accessories can be used to provide one or more features to a given bed sheet retention system including, but not limited to, a shelf for placement of keys, phone, or any other object; a cup holder; a basket; a pouch; an electric cord holder; an electric fan support; a charging pad; a light support; an open net support; a closed net support; a jointed arm device that has a distal arm end that is movable and is designed to hold an object, e.g., a book, a phone, a computer pad, etc., a guardrail extending along a side edge of a bed, a scented or scent-producing accessory designed to provide a scent within an area surrounding the accessory, or any combination thereof.

The attachable accessories of the present invention are suitable for use with a variety of bed sheet retention devices including, but not limited to, (1) the bed sheet retention devices disclosed in International Patent Application No. PCT/US2023/079473, (2) the bed sheet retention devices disclosed in U.S. patent application Ser. No. 18/986,848 filed on Dec. 19, 2024, (3) the bed sheet retention devices disclosed in U.S. patent application Ser. No. 18/945,224 filed on Nov. 12, 2024, and (4) the bed sheet retention devices disclosed in U.S. patent application Ser. No. 19/072,092 filed on Mar. 6, 2025, and entitled "BED SHEET RETENTION SYSTEMS, SYSTEM COMPONENTS, AND METHODS OF MAKING AND USING THE SAME," the subject matter of all of which is hereby incorporated in its entirety.

The present invention is also directed to bed sheet retention systems comprising one or more of the herein-described accessories. In some embodiments, the disclosed bed sheet retention systems comprise (I) one or more bed sheet retention devices, wherein at least one bed sheet retention device comprises: a side or corner bracket comprising: (a) a horizontally-extending bracket component sized and designed to extend between a bottom surface of a mattress and a support surface under the bottom surface; and (b) one or more sheet-engaging channels connected to said horizontally-extending bracket component, wherein each sheet-engaging channel (1) comprises a sheet-locking member extending along an outer surface of the side or corner bracket, and (2) extends substantially within a plane P parallel with said horizontally-extending bracket component or at an angle A to the plane P parallel with said horizontally-extending bracket component; and (II) one or more accessories, wherein each accessory comprises (a) at least one accessory connecting member, and (b) an accessory body connected to and extending from the at least one accessory connecting member, wherein the at least one accessory connecting member is configured to extend within and connect to the one or more sheet-engaging channels of the side or corner bracket.

In other embodiments, the disclosed bed sheet retention systems comprise (I) one or more bed sheet retention devices, wherein at least one bed sheet retention device comprises: a side or corner bracket comprising: (a) a horizontally-extending bracket component sized and designed to extend between a bottom surface of a mattress and a support surface under the bottom surface; and (b) one or more sheet-engaging channels connected to said horizontally-extending bracket component, wherein each sheet-engaging channel (1) comprises a sheet-locking member extending along an outer surface of the side or corner bracket, and (2) extends substantially within a plane P parallel with said horizontally-extending bracket component or at an angle A to the plane P parallel with said horizontally-extending bracket component; (II) one or more sheet locking strips that engage with one or more of the one or more sheet-engaging channels, and (III) one or more accessories, wherein each accessory comprises (a) at least one accessory connecting member, and (b) an accessory body connected to and extending from the at least one accessory connecting member, wherein the at least one accessory connecting member is configured to extend within and connect to the one or more sheet-engaging channels of the side or corner bracket.

In some embodiments, the disclosed bed sheet retention systems comprise (I) one or more bed sheet retention devices, wherein at least one bed sheet retention device comprises: a mattress or mattress cover having one or more sheet-engaging channels thereon; and (II) one or more accessories, wherein each accessory comprises (a) at least one accessory connecting member, and (b) an accessory body connected to and extending from the at least one accessory connecting member, wherein the at least one accessory connecting member is configured to extend within and connect to the one or more sheet-engaging channels of the mattress or mattress cover.

In some embodiments, the disclosed bed sheet retention systems comprise (I) one or more bed sheet retention devices, wherein at least one bed sheet retention device comprises: a mattress or mattress cover having one or more sheet-engaging channels thereon; (II) one or more sheet locking strips that engage with one or more of the one or more sheet-engaging channels, and (III) one or more accessories, wherein each accessory comprises (a) at least one accessory connecting member, and (b) an accessory body connected to and extending from the at least one accessory connecting member, wherein the at least one accessory connecting member is configured to extend within and connect to the one or more sheet-engaging channels of the mattress or mattress cover.

In some embodiments, the method of making an accessory comprises: forming an accessory comprising: (a) at least one accessory connecting member, and (b) an accessory body connected to and extending from the at least one accessory connecting member, wherein the at least one accessory connecting member is configured to extend within and connect to (1) one or more side or corner brackets of a bed sheet retention device, and/or (2) one or more sheet-engaging channels along (i) a mattress, or (ii) a mattress cover, said forming step utilizing one or more steps comprising: one or more thermoforming steps (e.g., a molding steps); one or more machining steps (e.g., one or more drilling, cutting, stamping, sanding, abrading, etc., steps); and one or more assembling steps.

The present invention is even further directed to methods of using bed sheet retention devices and accessories with bed sheet retention devices. In some embodiments, the method of using a bed sheet retention device comprises: inserting a horizontally-extending bracket component of the bed sheet retention device between a bottom surface of a mattress and a support surface under the bottom surface; and engaging a sheet material with one or more sheet-engaging channels along a bed sheet retention device, wherein each sheet-engaging channel (1) comprises a sheet-locking member extending along an outer surface of a bracket, and (2) extends substantially within a plane P parallel with the horizontally-extending bracket component or at an angle A to the plane P parallel with said horizontally-extending bracket component, wherein the sheet-locking member comprises (i) an upper sheet-locking channel member, and a lower sheet-locking channel member positioned below and spaced from the upper sheet-locking channel member, wherein each of the upper sheet-locking channel member and the lower sheet-locking channel member are designed to engage with one or more sheet locking strips and/or one or more of the herein-described attachable accessories, said engaging step comprising inserting one or more sheet locking strips and/or one or more of the herein-described attachable accessories between the upper sheet-locking channel member and the lower sheet-locking channel member of the bracket.

In some embodiments, the method of using an accessory comprises: connecting an accessory to (1) a corner or side bracket of a bed sheet retention device, and/or (2) one or more sheet-engaging channels along (i) a mattress, or (ii) a mattress cover, the accessory comprising: (a) at least one accessory connecting member, and (b) an accessory body connected to and extending from the at least one accessory connecting member, wherein said connecting step comprises connecting the at least one accessory connecting member of the accessory to one or more sheet-engaging channels of (1) the corner or side bracket, and/or (2) the one or more sheet-engaging channels along (i) the mattress, or (ii) the mattress cover.

These and other features and advantages of the present invention will become apparent after a review of the following detailed description of the disclosed embodiments and the appended claims.

BRIEF DESCRIPTION OF THE FIGURES

The present invention is further described with reference to the appended figure, wherein.

Figure 1A:
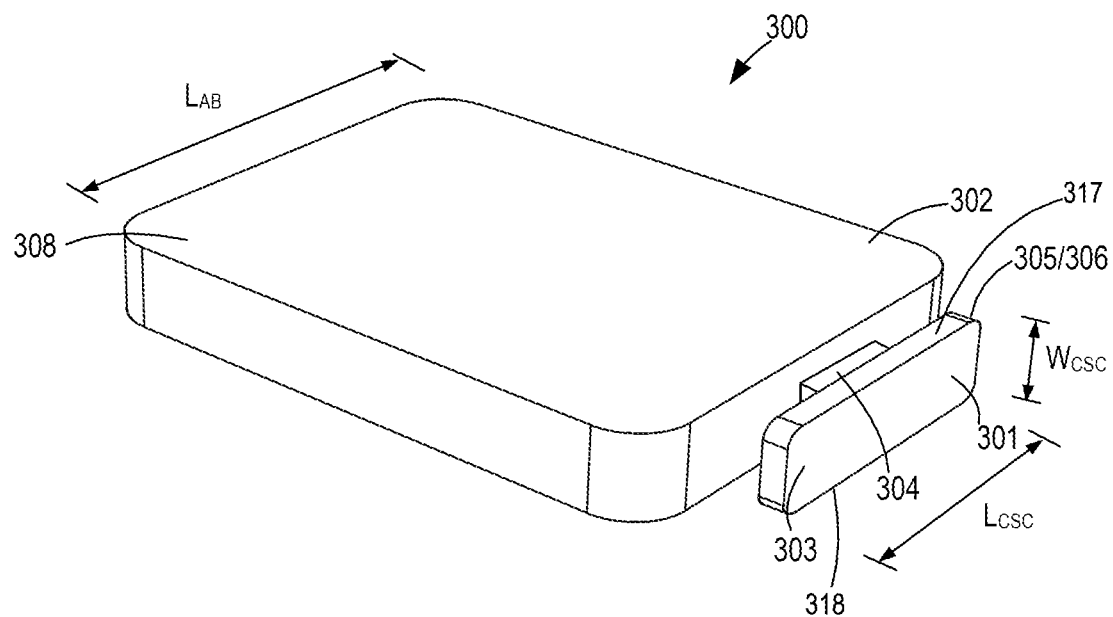
FIG. 1A depicts a perspective view of an exemplary accessory suitable for use with bed sheet retention devices, and in bed sheet retention systems.

The features of the present bed sheet retention devices, bed sheet retention system accessories, and bed sheet retention systems, and methods are set forth in part in the following preferred embodiments. This overview is intended to provide nonlimiting descriptions of the present subject matter and is not intended to provide an exclusive or exhaustive explanation. The preferred embodiments below provide further information about the bed sheet retention devices and systems, and methods of the present invention as described herein.

DETAILED DESCRIPTION OF THE INVENTION

The present invention is directed to accessories suitable for use with bed sheet retention devices, and in bed sheet retention system accessories, and bed sheet retention devices and systems comprising one or more of the herein-described accessories.

FIGS. 1A-15 depict various accessories 300 of the present invention. FIGS. 7-8, and 12-15 depict an exemplary accessory 300 of the present invention attached to a sheet-engaging channel 12 of a bed sheet retention device 100 in the form of a corner bracket 10. It should be noted that even though exemplary accessories 300 are not shown connected to a side bracket 40, or a mattress covering component 110, or a mattress cover 120, or a mattress 50, or a mattress band 110', or a mattress covering strip portion 133, exemplary accessories 300 of the present invention attach to one or more sheet-engaging channel 12 along each of these types of bed sheet retention devices in a manner substantially identical to the manner in which exemplary accessory 300 is attached to the sheet-engaging channel 12 of the corner bracket 10 shown in FIGS. 7-8, and 12-15.

As shown in FIGS. 6A-6H, a variety of exemplary accessories 300 of the present invention are shown attached to a sheet-engaging channel 12 along a bed sheet retention device 100 in the form of a corner bracket 10, a side bracket 40, and/or a mattress covering component 110. As noted above, FIGS. 7-8, and 12-15 depict an exemplary accessory 300 of the present invention attached to a sheet-engaging channel 12 of a corner bracket 10. In all cases, the exemplary accessories 300 of the present invention comprise one or more accessory connecting members 301 that are designed and sized so as to extend within at least one sheet-engaging channel 12.

Figure 16:
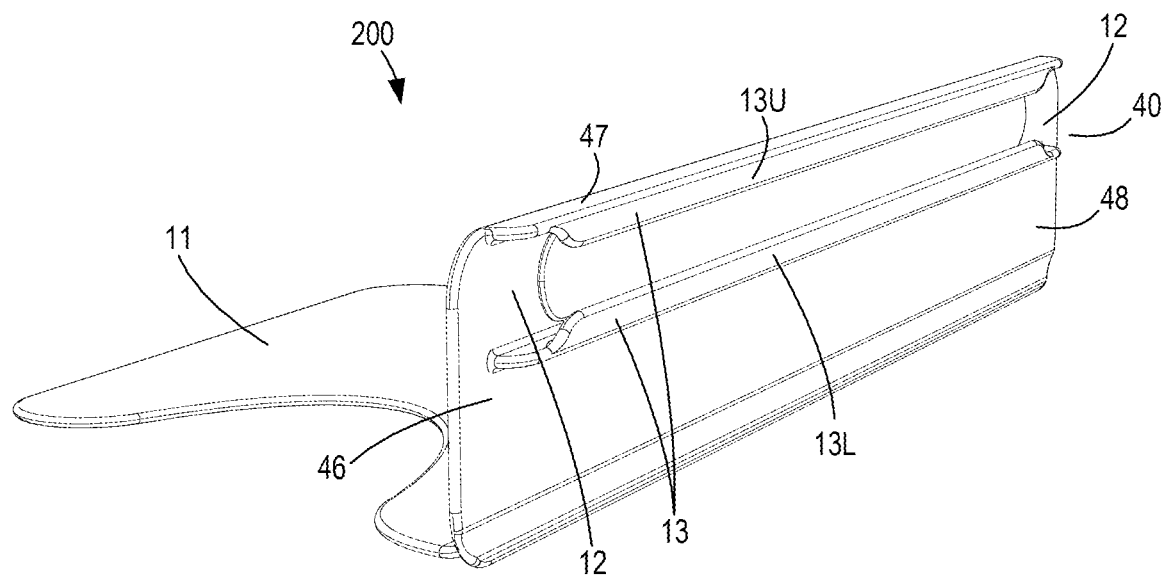
FIG. 16 depicts a perspective front view of another exemplary bed sheet retention device suitable for use with the accessories of the present invention.
Figure 17:
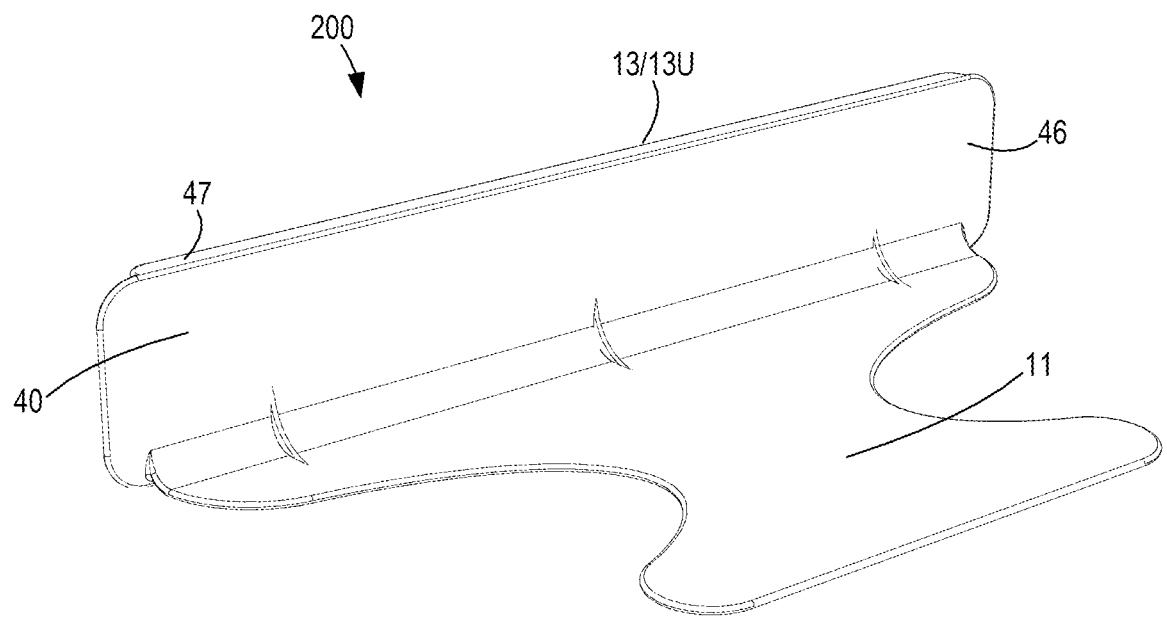
FIG. 17 depicts a perspective rear view of the exemplary bed sheet retention device shown in FIG. 16.
Figure 18:
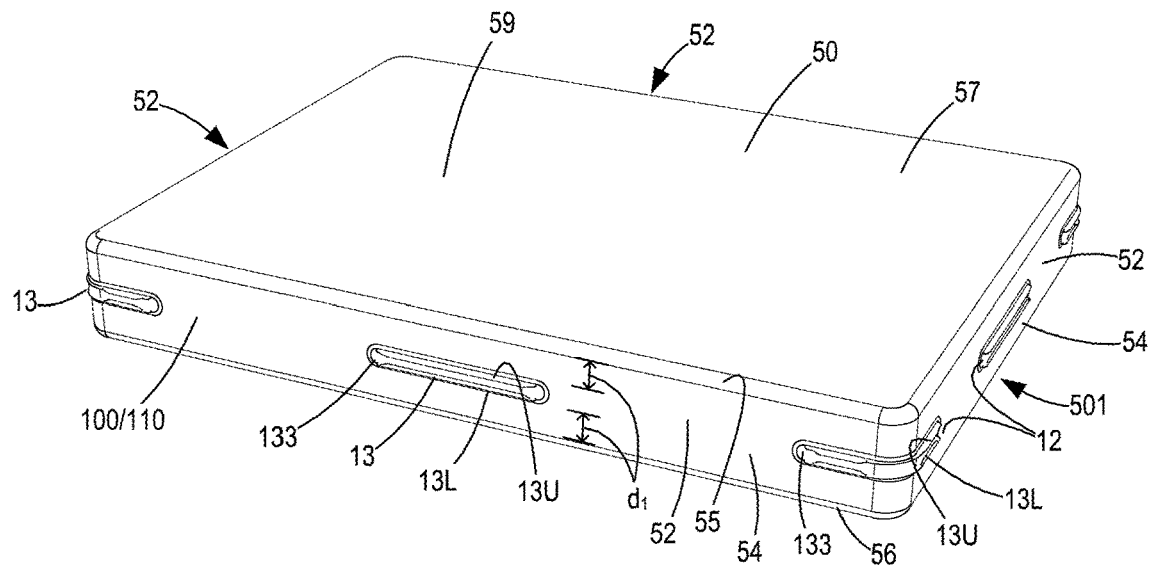
FIG. 18 depicts a perspective view of another exemplary bed sheet retention device suitable for use with the accessories of the present invention.
Figure 19:
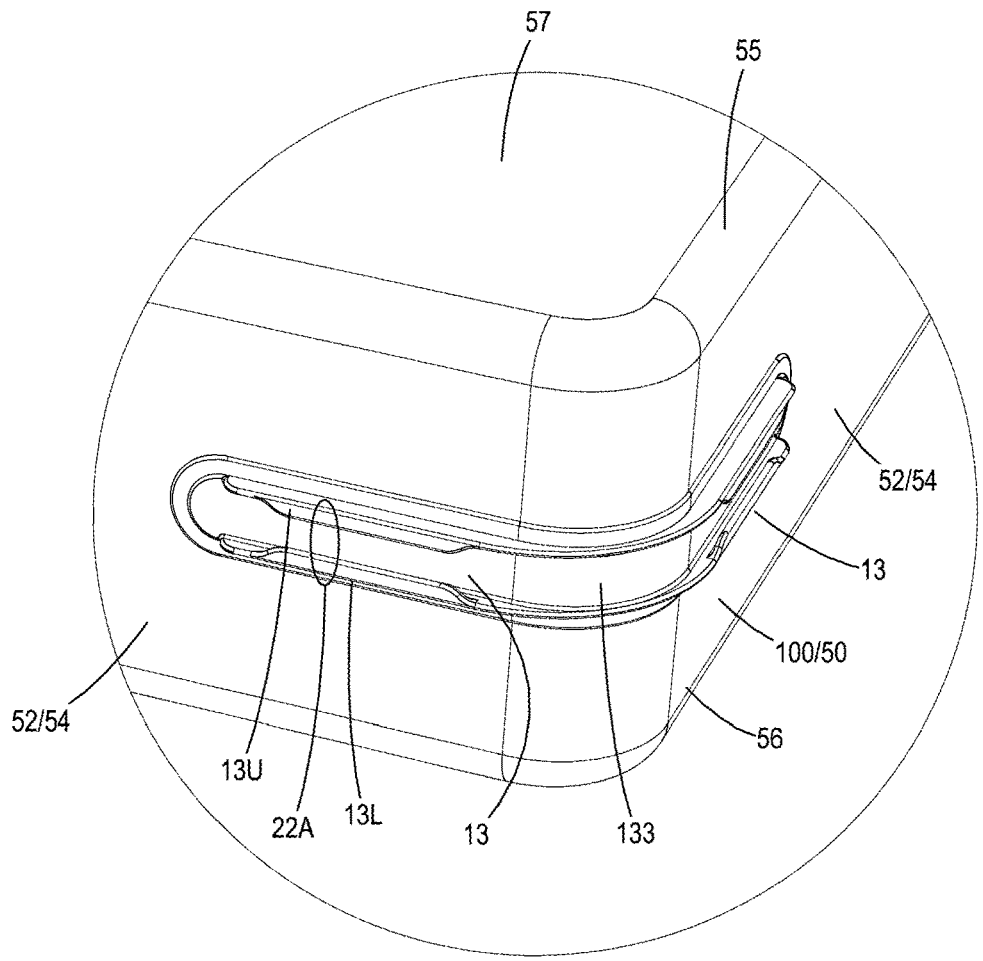
FIG. 19 depicts a close-up view of an exemplary sheet-locking member positioned along adjacent side surfaces of the exemplary bed sheet retention device shown in FIG. 18.
Figure 20:
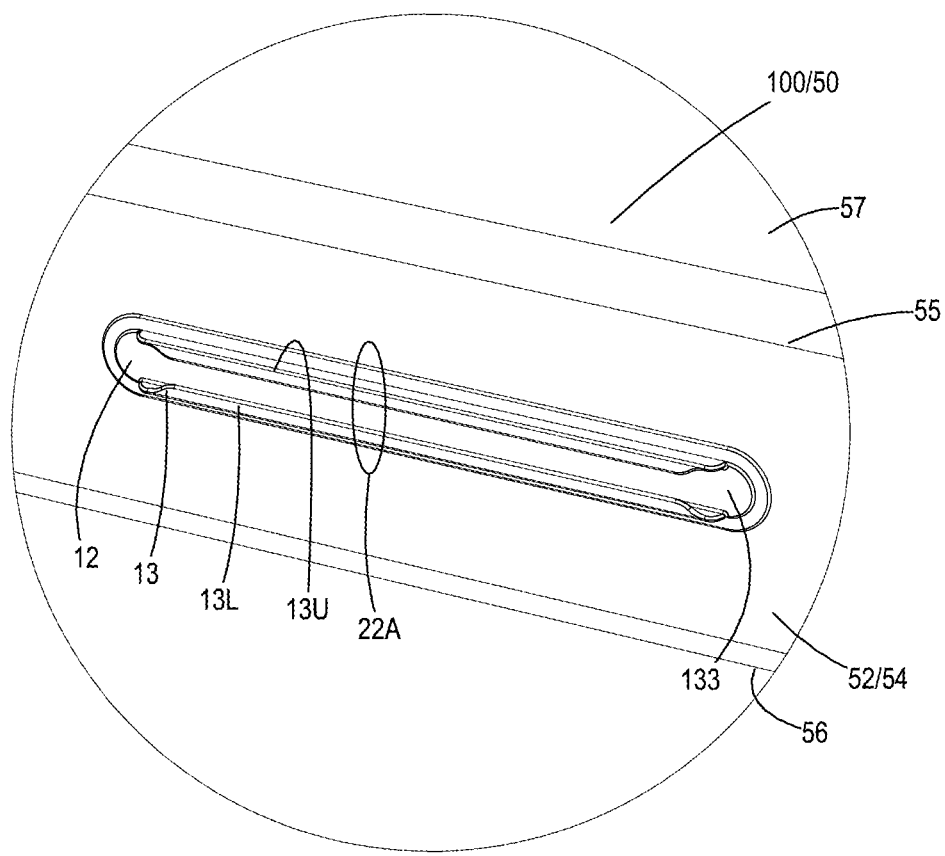
FIG. 20 depicts another close-up view of another exemplary sheet-locking member positioned along a side surface of the exemplary bed sheet retention device shown in FIG. 18.
Figure 24A:
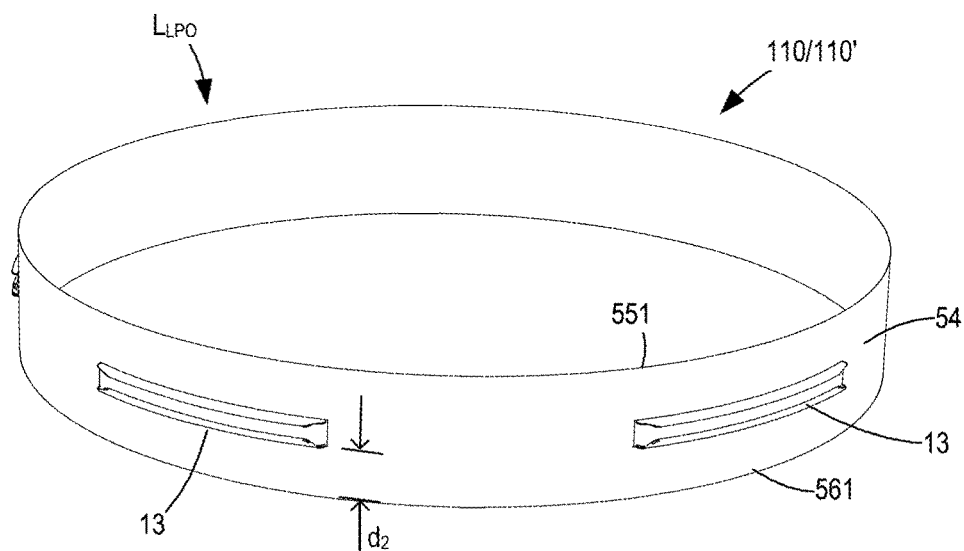
FIGS. 24A-24B depict a perspective view of another exemplary bed sheet retention device suitable for use with the accessories of the present invention.
Figure 24B:
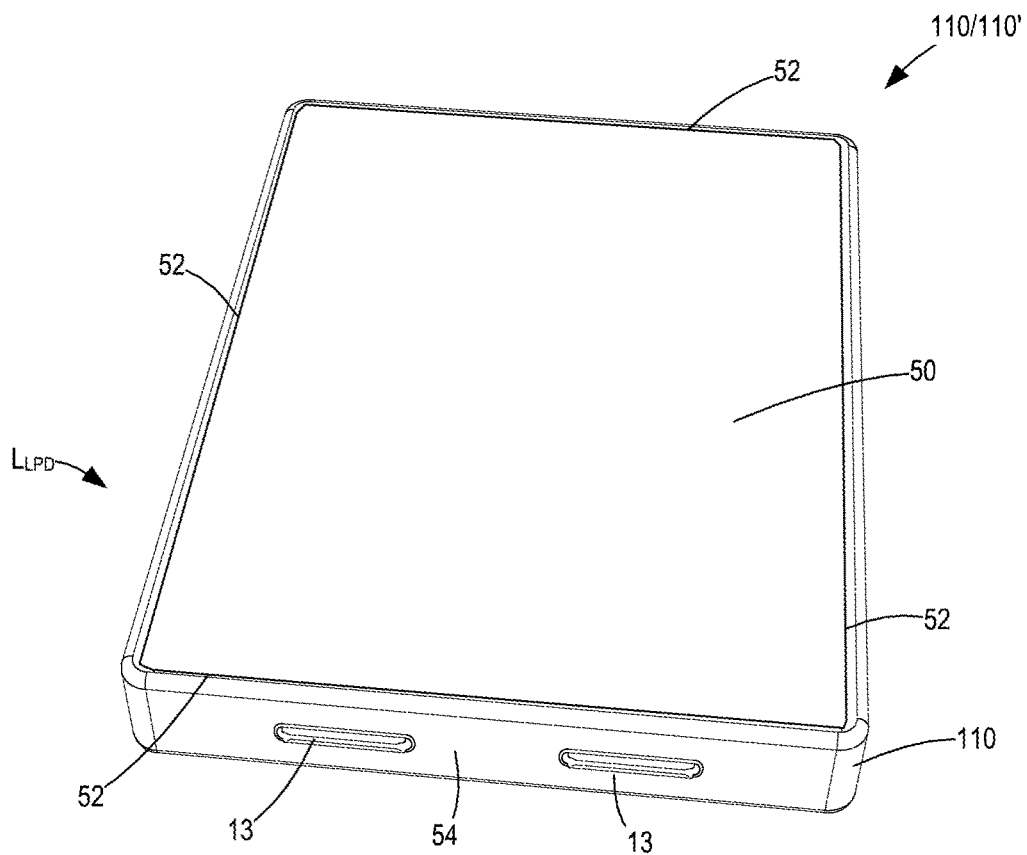
Figure 25:
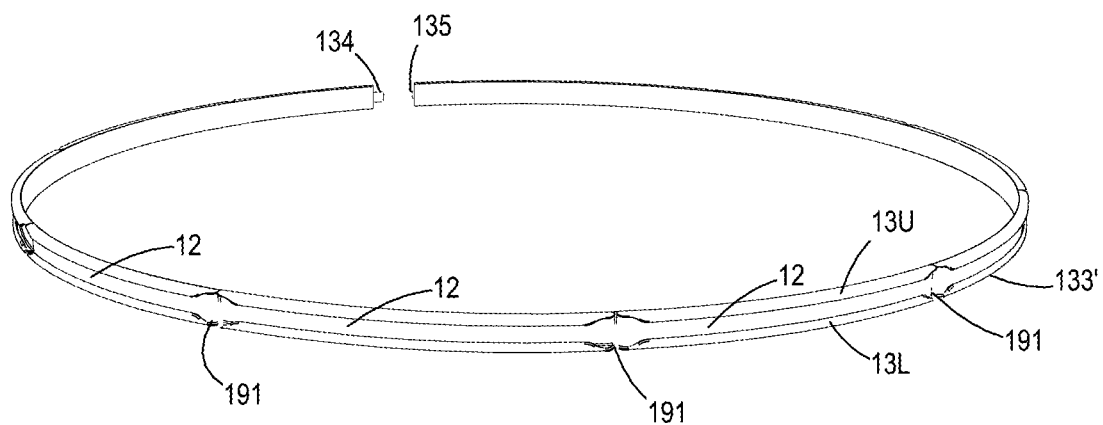
FIG. 25 depicts a perspective view of another exemplary bed sheet retention device suitable for use with the accessories of the present invention.
Figure 26:
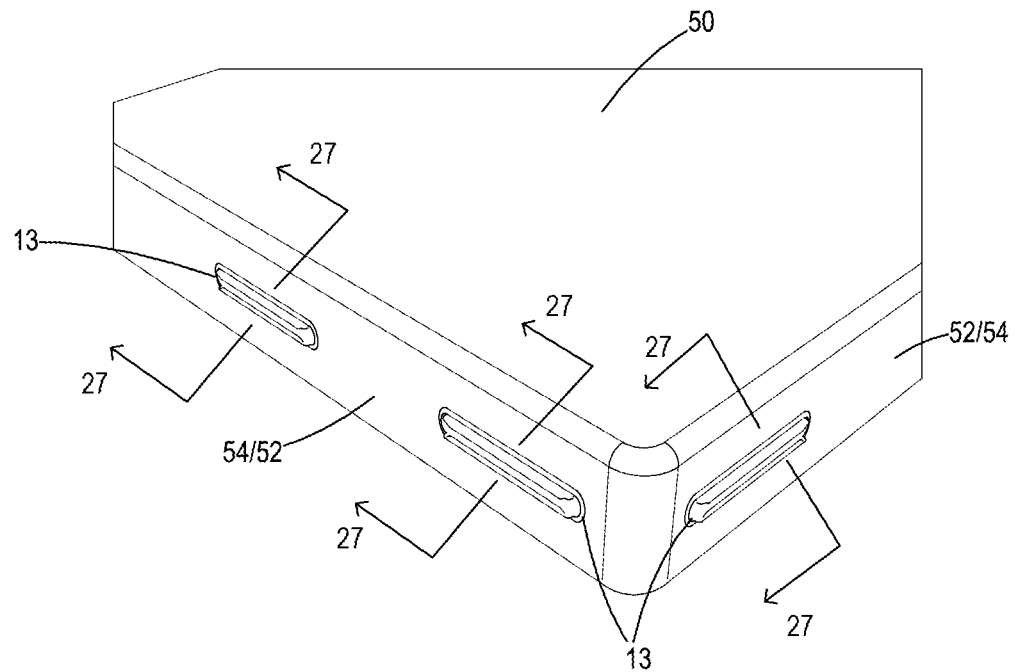
FIG. 26 depicts a perspective view of another exemplary bed sheet retention device suitable for use with the accessories of the present invention.
Figure 27:
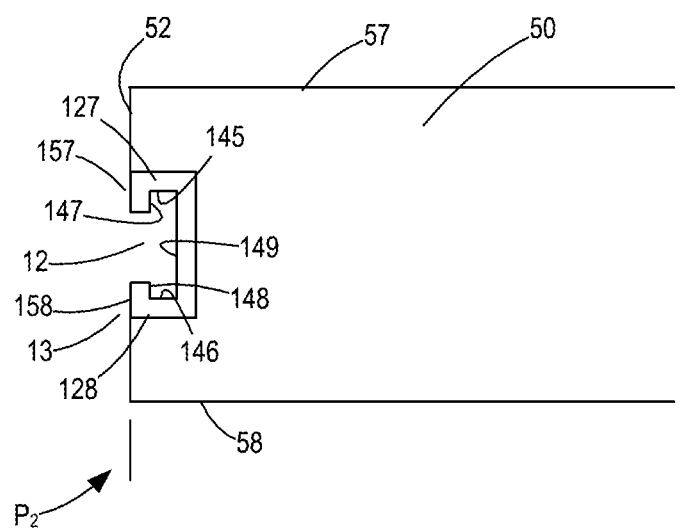
FIG. 27 depicts a cross-sectional view of exemplary sheet-locking members embedded within a side surface of a mattress as viewed along lines 27-27 shown in FIG. 26.

FIGS. 16-27 depict various bed sheet retention devices that could be used with the accessories 300 of the present invention. In particular, (I) FIGS. 16-17 depict views of an exemplary side bracket 40 as described in embodiments 60 to 105 of (1) U.S. patent application Ser. No. 18/945,224, (2) U.S. patent application Ser. No. 18/986,848, and (3) U.S. patent application Ser. No. 19/072,092, the subject matter of all of which is hereby incorporated by reference in its entirety; (II) FIGS. 18-20 depict views of an exemplary mattress covering component 110/mattress 50 as described in embodiments 106 to 188, and 197 to 207 of U.S. patent application Ser. No. 19/072,092, the subject matter of all of which is hereby incorporated by reference in its entirety; (III) FIGS. 21A and 21C depict views of an exemplary mattress covering component 110/mattress cover 120 as described in embodiments 106 to 181, and 189 to 196 of U.S. patent application Ser. No. 19/072,092, the subject matter of which is hereby incorporated by reference in its entirety; (IV) FIGS. 24A and 24B depict views of an exemplary mattress covering component 110/mattress cover 120 as described in embodiments 106 to 178, and 208 to 211 of U.S. patent application Ser. No. 19/072,092, the subject matter of which is hereby incorporated by reference in its entirety; and (V) FIG. 25 depicts a view of an exemplary mattress covering component 110/mattress strip 133' as described in embodiments 106 to 178, and 212 to 219 of U.S. patent application Ser. No. 19/072,092, the subject matter of which is hereby incorporated by reference in its entirety.

Figure 1B:
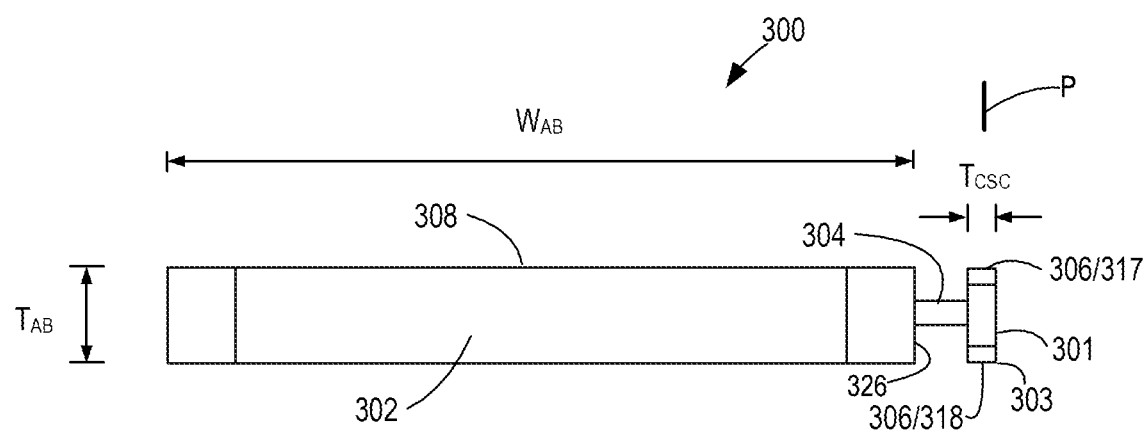
FIG. 1B depicts a side view of the exemplary accessory shown in FIG. 1A.
Figure 2A:
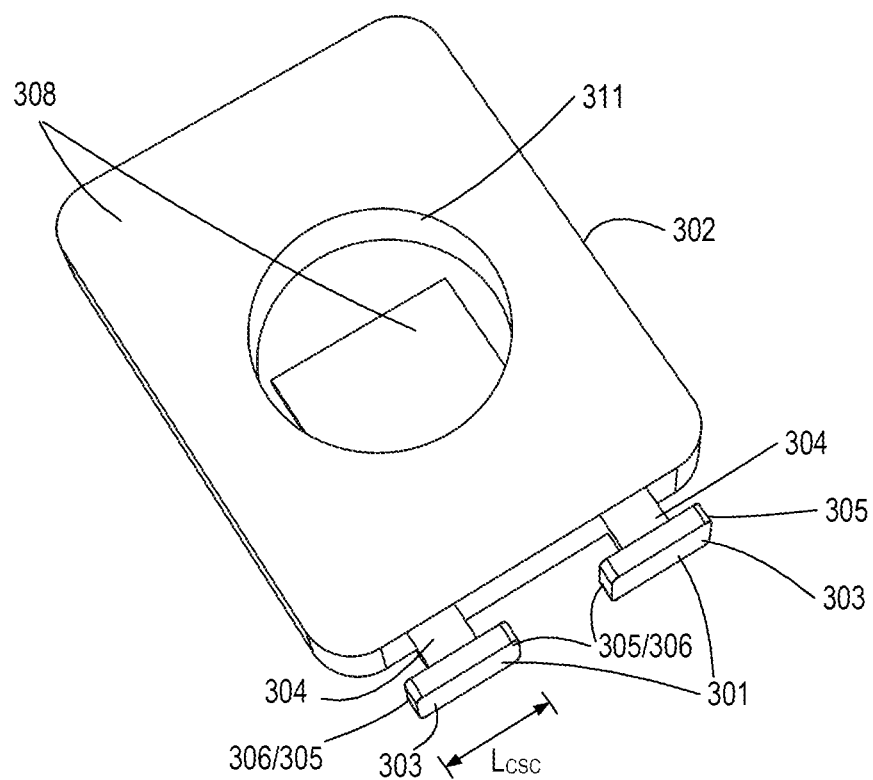
FIG. 2A depicts a perspective view of another exemplary accessory suitable for use with bed sheet retention devices, and in bed sheet retention systems.
Figure 2B:
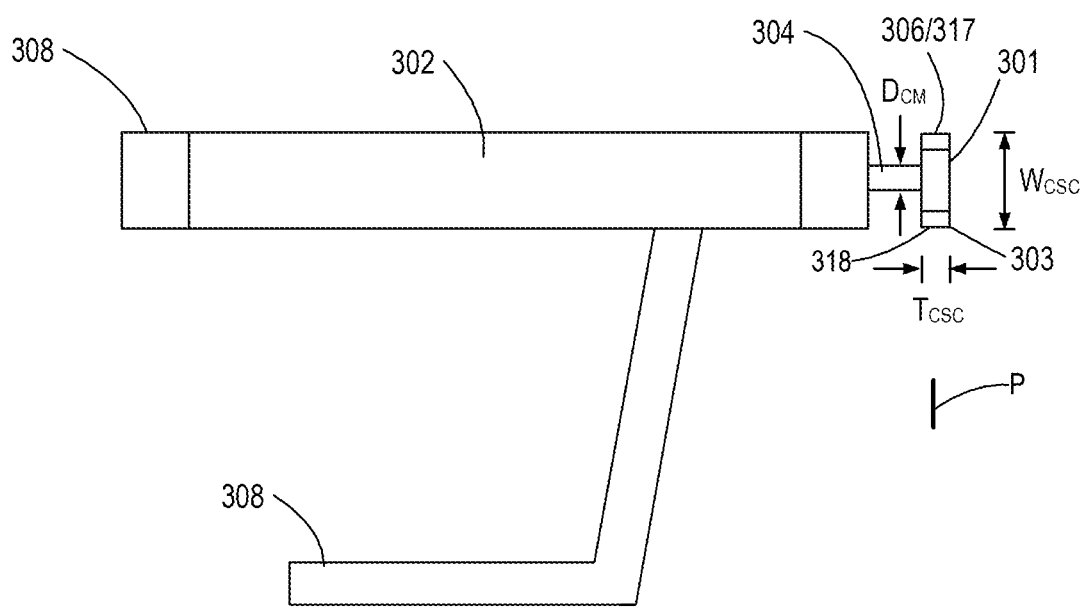
FIG. 2B depicts a side view of the exemplary accessory shown in FIG. 2A.
Figure 3A:
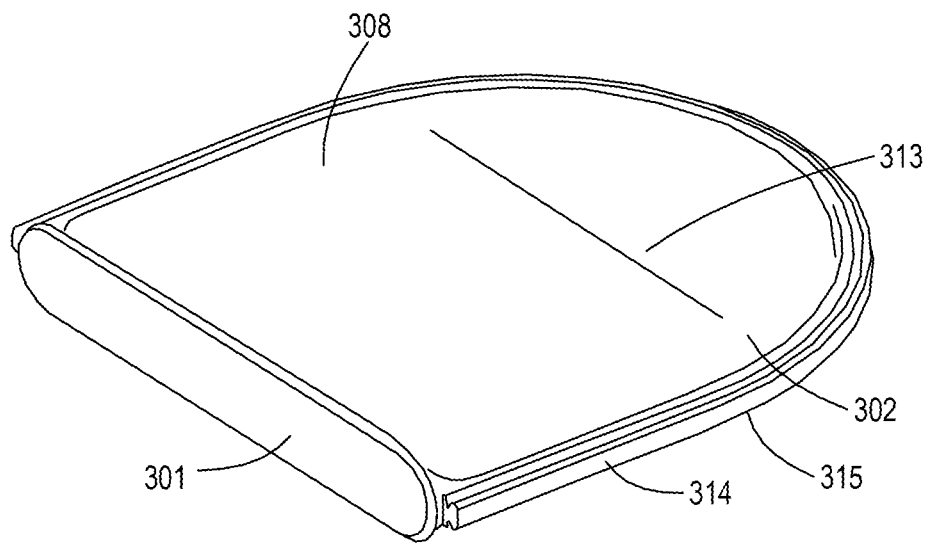
FIG. 3A depicts a perspective view of another exemplary accessory suitable for use with bed sheet retention devices, and in bed sheet retention systems.
Figure 3B:
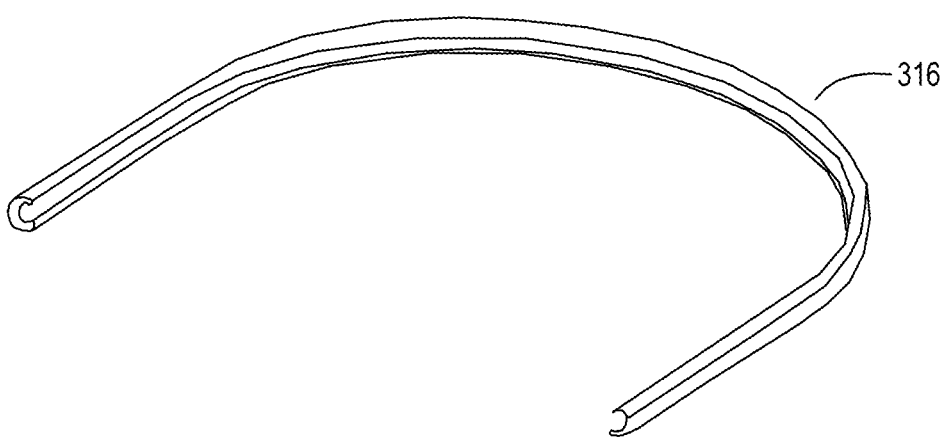
FIG. 3B depicts a perspective view of an exemplary clamping member suitable for use with the exemplary accessory shown in FIG. 3A.
Figure 3C:
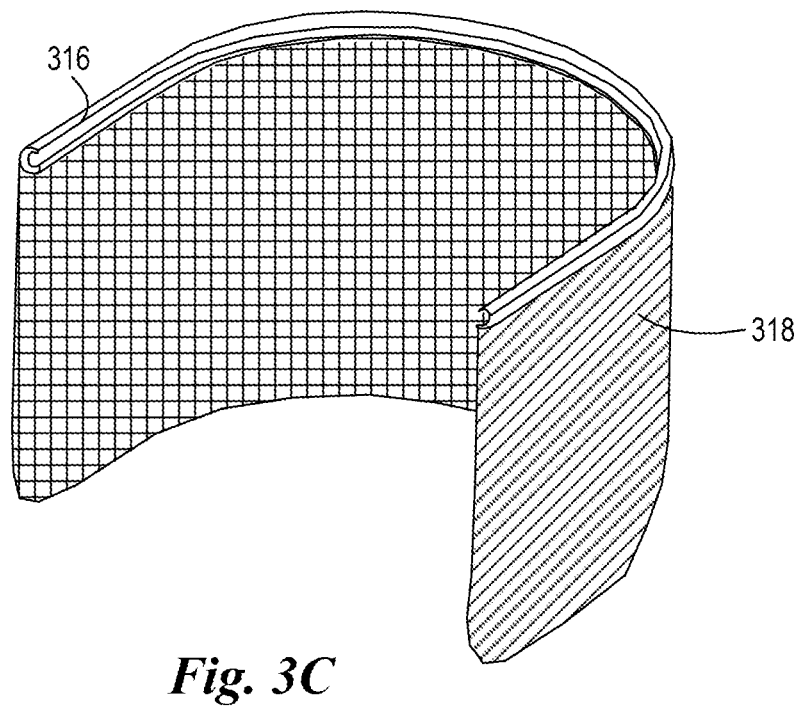
FIG. 3C depicts a perspective view of an exemplary skirt suitable for use with the exemplary accessory shown in FIG. 3A.
Figure 3D:
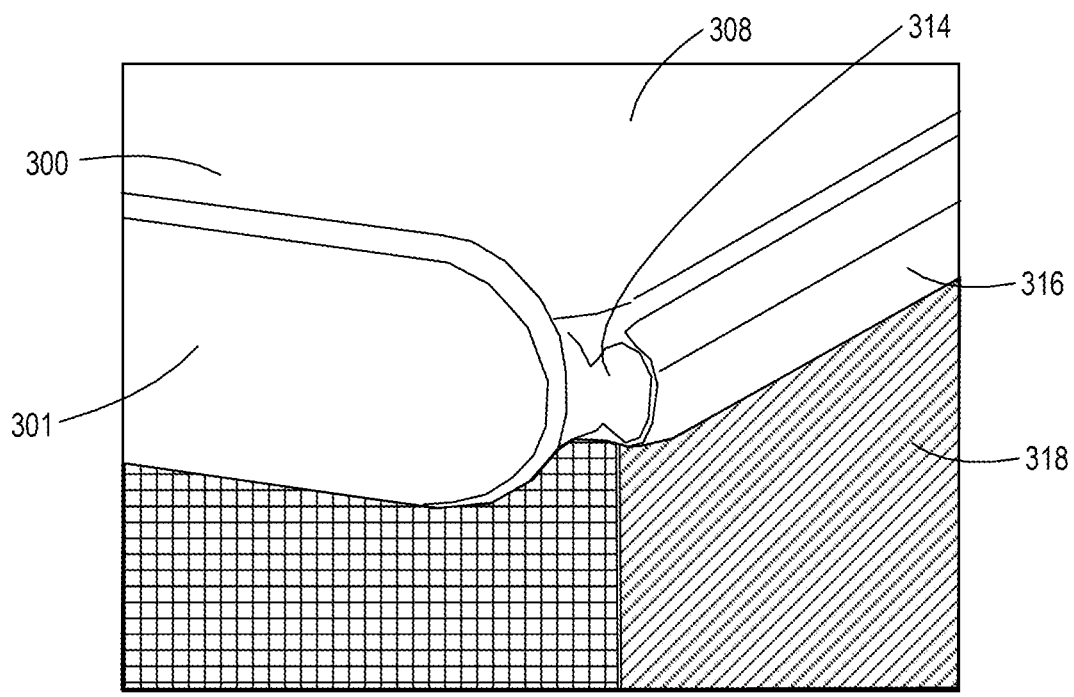
FIG. 3D depicts a close-up view of the exemplary skirt shown in FIG. 3C attached to an outer rim of the exemplary accessory shown in FIG. 3A via the exemplary clamping member shown in FIG. 3B.
Figure 3E:
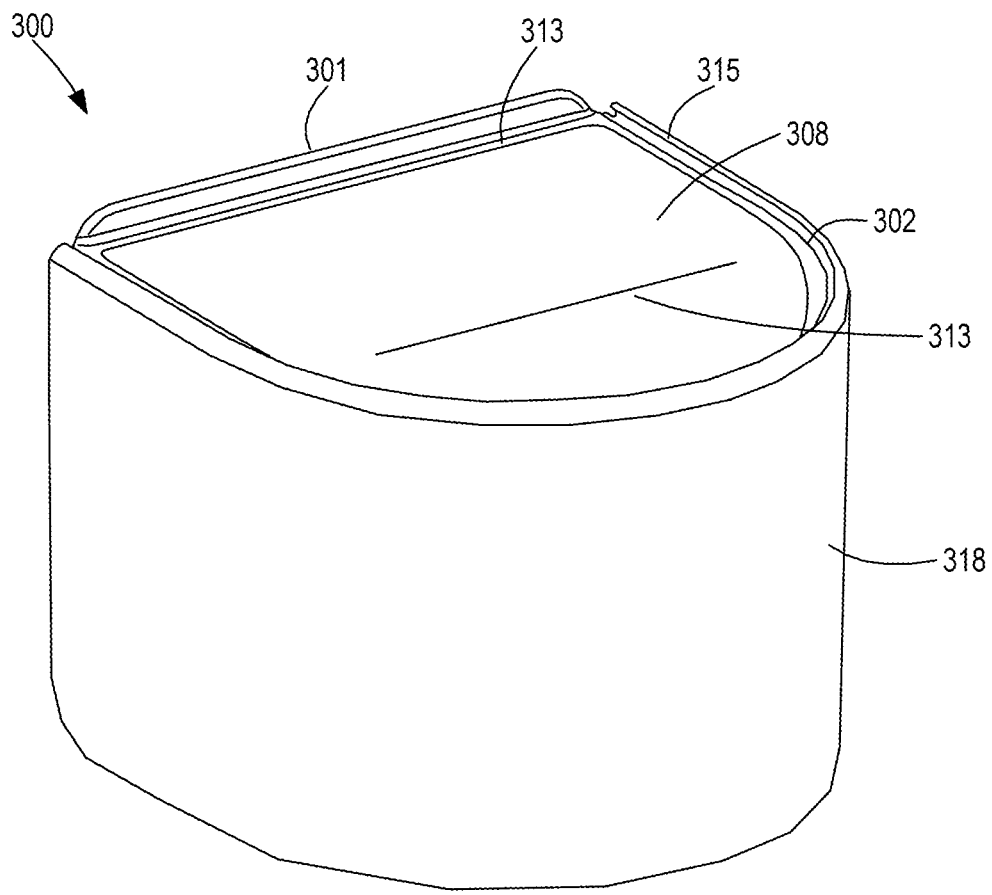
FIG. 3E depicts a perspective front view of an exemplary accessory combination comprising the exemplary accessory shown in FIG. 3A with the exemplary skirt shown in FIG. 3C attached to an outer rim thereof via the exemplary clamping member shown in FIG. 3B.
Figure 4:
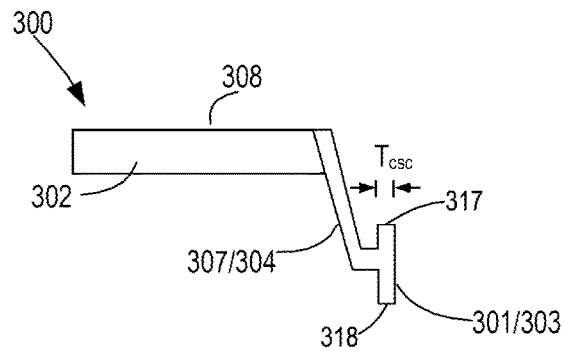
FIG. 4 depicts a side view of another exemplary accessory suitable for use with bed sheet retention devices, and in bed sheet retention systems.
Figure 5A:
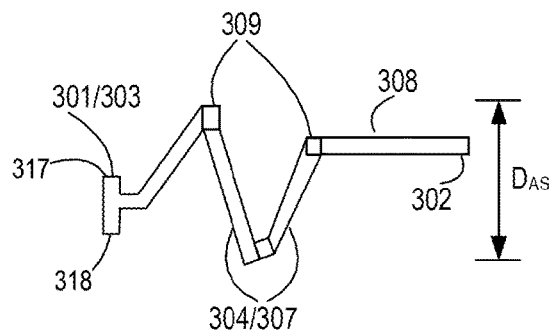
FIGS. 5A-5B depict side views of another exemplary accessory suitable for use with bed sheet retention devices, and in bed sheet retention systems.
Figure 5B:
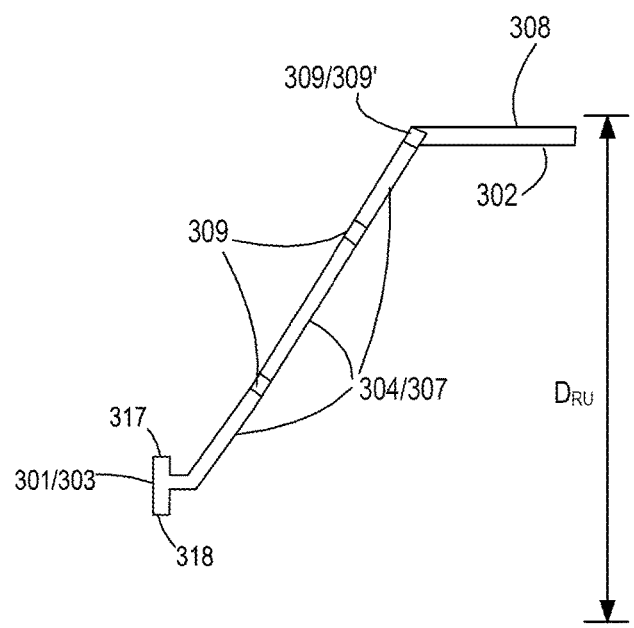

As shown in FIGS. 1A-1B, exemplary accessory 300 comprise a single accessory connecting member 301 extending from a rear surface 326 of exemplary accessory body 302. The single accessory connecting member 301 comprises a vertically-extending connecting strip component 303 attached to the accessory body 302 via one or more intermediate connecting members 304. The vertically-extending connecting strip component 303 comprises an upwardly-extending upper-edge connecting member 317, and a downwardly-extending lower-edge connecting member 318 opposite the upwardly-extending upper-edge connecting member 317. The upwardly-extending upper-edge connecting member 317, and the downwardly-extending lower-edge connecting member 318 are both within a vertically-extending plane P that is substantially parallel with rear surface 326 of exemplary accessory body 302.

In other embodiments, such as shown in FIGS. 10 and 13-15, exemplary accessories 300 of the present invention comprise two accessory connecting members 301 extending from a rear surface 326 of exemplary accessory body 302. Each of the two accessory connecting members 301 is attached to the accessory body 302 via one or more intermediate connecting members 304. One of the two accessory connecting members 301 comprises an upwardly-extending upper-edge connecting member 317, and the other of the two accessory connecting members 301 comprises a downwardly-extending lower-edge connecting member 318 opposite the upwardly-extending upper-edge connecting member 317. The upwardly-extending upper-edge connecting member 317, and the downwardly-extending lower-edge connecting member 318 are both within a vertically-extending plane P that is substantially parallel with rear surface 326 of exemplary accessory body 302.

In addition, it should be noted that an upper edge end 317' of the upwardly-extending upper-edge connecting member 317, and a lower edge end 318' of the downwardly-extending lower-edge connecting member 318 are separated from one another by a distance (or width) referred to herein as $W_{CSC}$, and the distance (or width) $W_{CSC}$ is less than an overall height of a channel track profile within a given sheet-engaging channel 12. See, for example, FIG. 13. The distance (or width) $W_{CSC}$ is also greater than a distance $D_{CM}$, which represents a distance between (i) an uppermost portion of one or more intermediate connecting members 304, and (ii) a lowermost portion of the one or more intermediate connecting members 304, the one or more intermediate connecting members 304 connecting an accessory body 302 to the one or more accessory connecting members 301. See, for example, $D_{CM}$ shown in FIGS. 2B and 10.

Figure 21A:
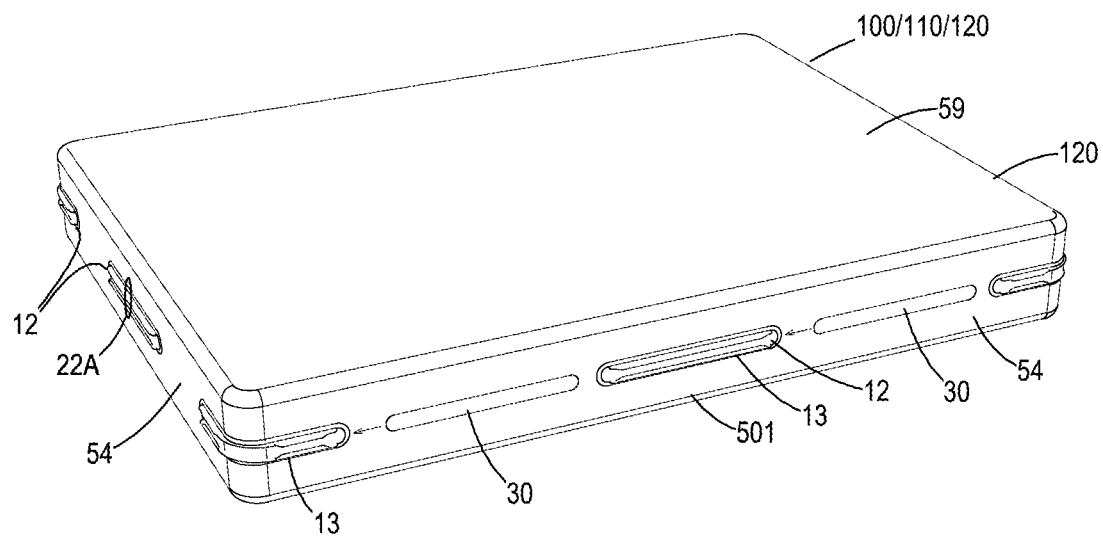
FIG. 21A depicts a perspective view of another exemplary bed sheet retention device suitable for use with the accessories of the present invention.
Figure 21B:
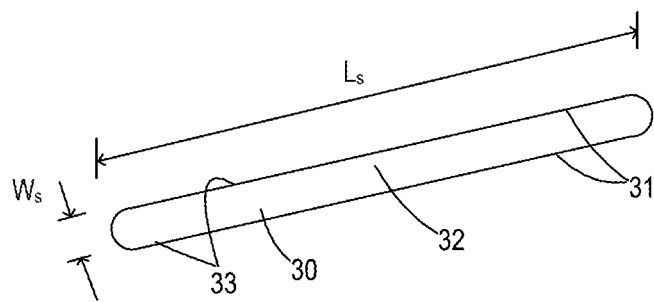
FIG. 21B depicts a perspective view of an exemplary sheet locking strip suitable for use with the bed sheet retention device suitable for use with the exemplary bed sheet retention devices shown in FIGS. 6A-7, 16, 18, and 21A.
Figure 21C:
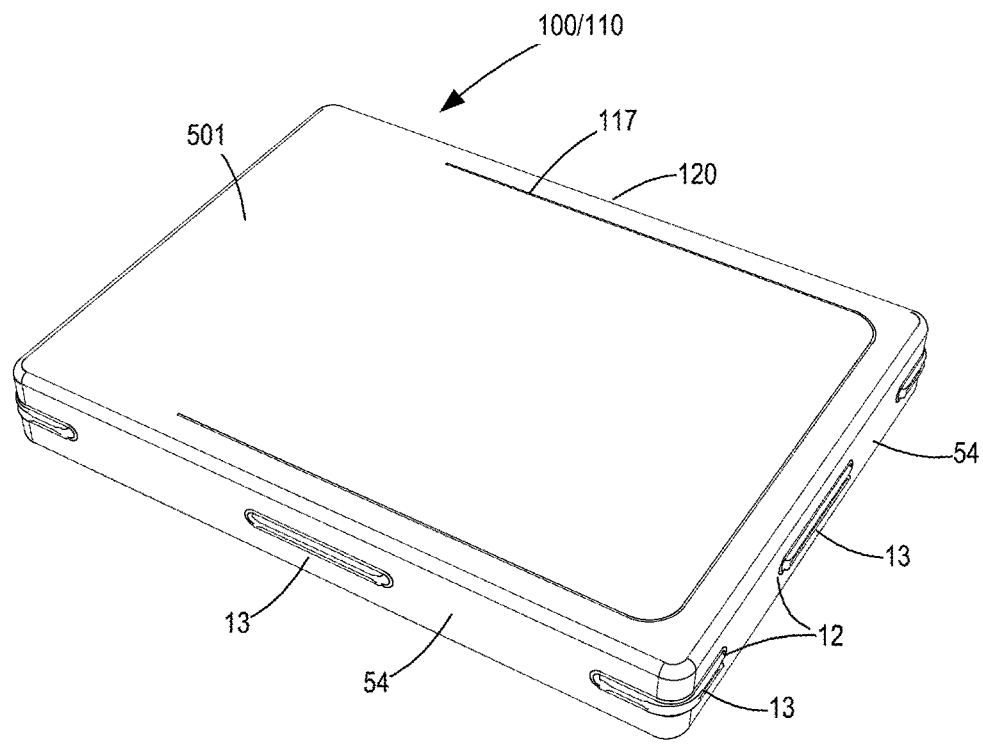
FIG. 21C depicts a perspective view of a lower surface of the exemplary bed sheet retention device shown in FIG. 21A.
Figure 22A:
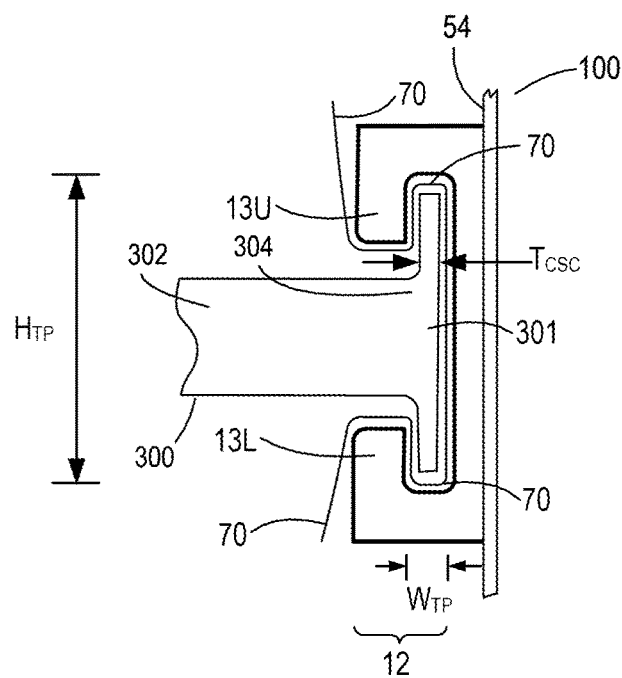
FIG. 22A depicts a cross-sectional view of the exemplary bed sheet retention device/exemplary sheet-locking member shown in FIGS. 19-21A.
Figure 22B:
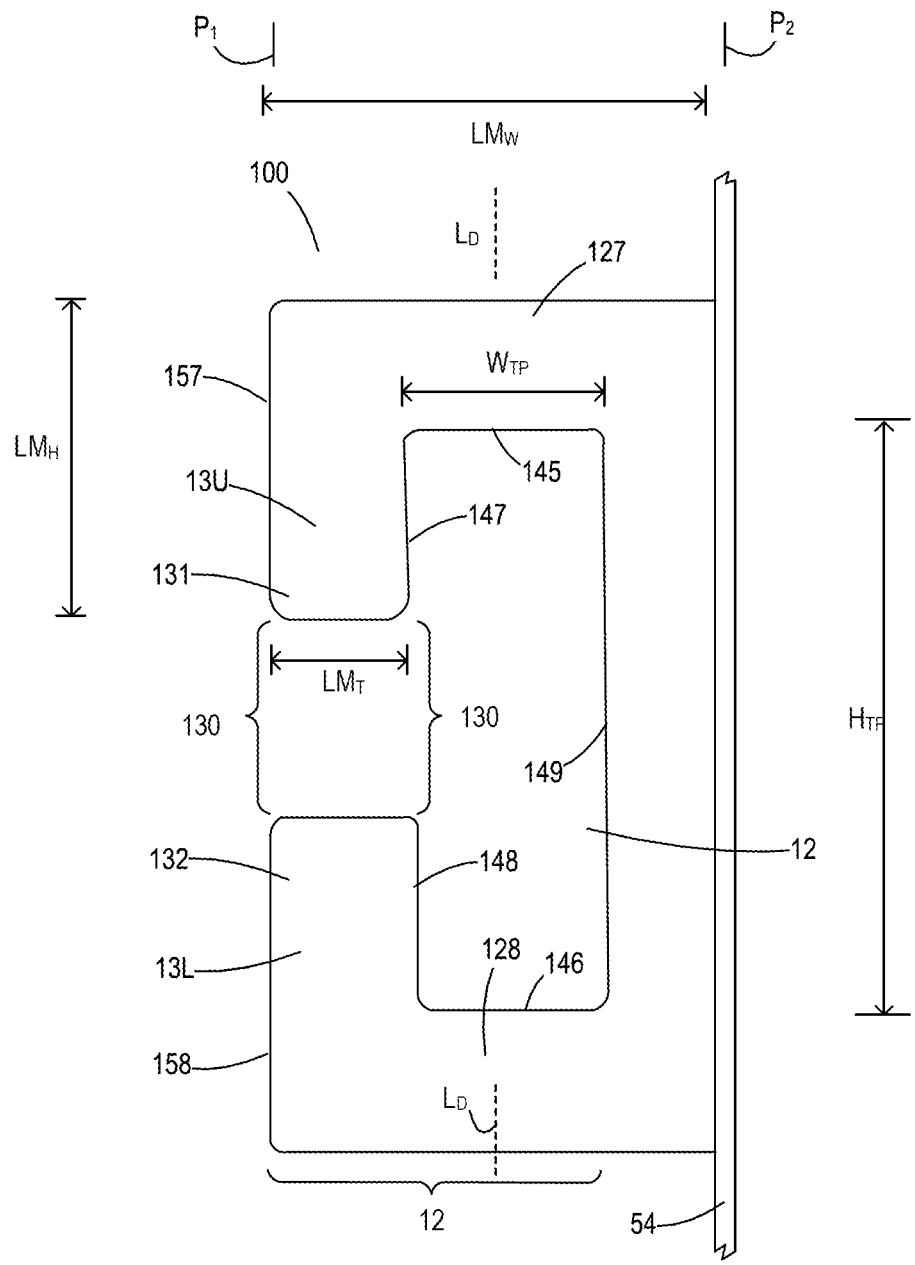
FIG. 22B depicts an exploded view of FIG. 22A.
Figure 22C:
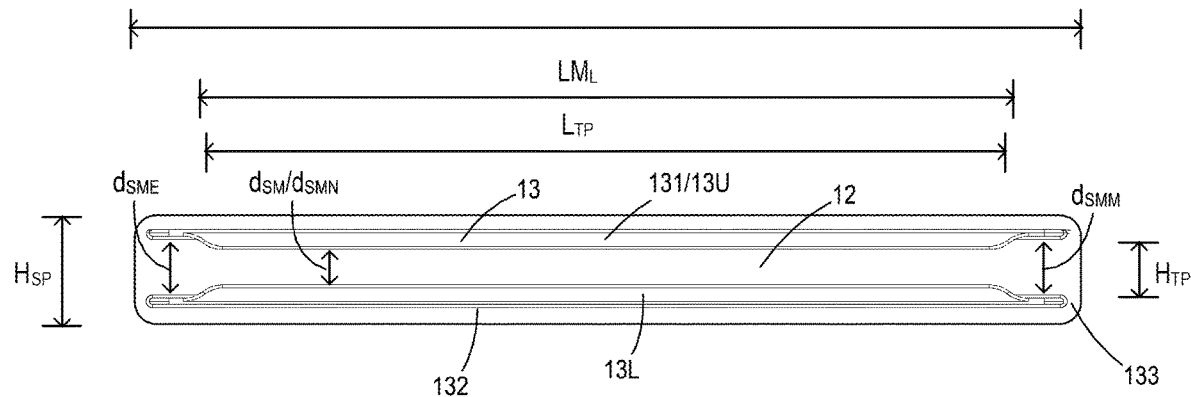
FIG. 22C depicts a front view of the exemplary sheet-locking member shown in FIGS. 18, and 20-21A.
Figure 23:
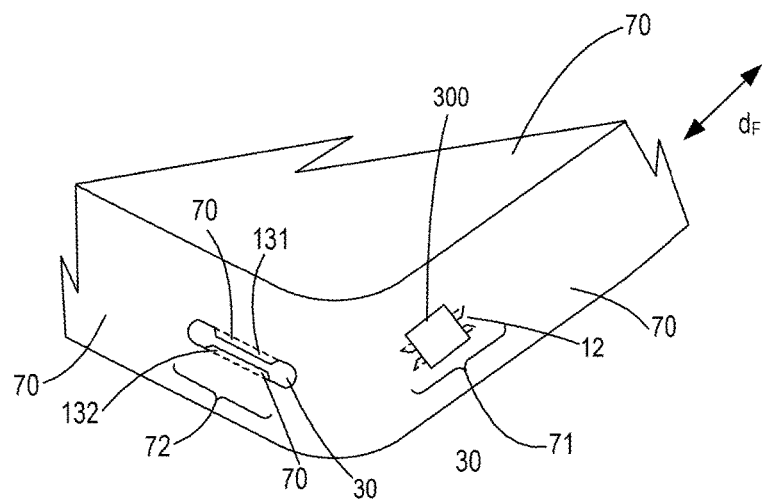
FIG. 23 depicts a perspective view of the exemplary bed sheet retention device shown in FIG. 19 while in use with an exemplary accessory, securing a sheet onto the exemplary bed sheet retention device via the exemplary accessory.

The herein-described accessories 300 are suitable for use with a variety of bed sheet retention devices and systems as shown in the figures. Further details of the bed sheet retention devices and systems shown in the figures are provided below:

(I) Exemplary side bracket 40 shown in FIGS. 16-17 comprises: (a) a horizontally-extending bracket component 11 sized and designed to extend between a bottom surface 51 of a mattress 50 and a support surface 60 under the bottom surface 51; and (b) one or more sheet-engaging channels 12 connected to said horizontally-extending bracket component 11, wherein each sheet-engaging channel 12 (1) comprises a sheet-locking member 13 extending along an outer surface 46 of the side bracket 40, and (2) extends (i) substantially within a plane P parallel with said horizontally-extending bracket component 11 or at an angle A to the plane P parallel with said horizontally-extending bracket component 11, and (ii) along a side edge (i.e., not a corner) of the mattress 50 and the support surface 60;

(II) Exemplary mattress covering component 110 shown in FIGS. 18-25 is designed and sized to extend over one or more side surfaces 52 of a mattress 50, said mattress covering component 110 comprising: (A) one or more side sheet portions 54 that extend over one or more side surfaces 52 of a mattress 50; and (B) one or more sheet-engaging channels 12 extending along the one or more side sheet portions 54, wherein each sheet-engaging channel 12 comprises a sheet-locking member 13 comprising: (i) an upper (or first) sheet-locking channel member 13U, and (ii) a lower (or second) sheet-locking channel member 13L spaced from said upper sheet-locking channel member 13U, wherein said upper sheet-locking channel member 13U and said lower sheet-locking channel member 13L (a) are designed to engage with one or more sheet-locking strips 30 (and/or accessories 300) inserted within the sheet-locking member 13 and between the upper sheet-locking channel member 13U and the lower sheet-locking channel member 13L, and (b) together provide a channel track profile that extends along a given sheet-locking member 13, wherein the mattress covering component 110 is (a) an integral component of mattress 50, and forms at least a portion 52' of said one or more side surfaces 52 of mattress 50, or (b) is separate from and combinable with mattress 50 so as to cover at least a portion 52' of the one or more side surfaces 52 of mattress 50. As used herein, the phrase "channel track profile" is used to describe a shape of a given sheet-engaging channel 12 extending along a given sheet-locking member 13 in which one or more sheet-locking strips 30 can be inserted. See, for example, FIGS. 22A-22C. The "channel track profile" includes an overall "channel track profile" length, as well as a "channel track profile" cross-sectional shape at any point along the "channel track profile" length. The "channel track profile" does not include any gap 130 that extends between opposing tip ends of an upper strip engaging member 131 and a lower strip engaging member 132, discussed below. It should be noted that although the gap 130 between opposing tip ends of upper strip engaging member 131 and lower strip engaging member 132 is shown in the figures as having a constant separation distance $d_{SM}$ between the opposing tip ends of upper strip engaging member 131 and lower strip engaging member 132 along a majority of a given sheet-locking member 13 (see, for example, FIG. 22C), the separation distance $d_{SM}$ between opposing tip ends of upper strip engaging member 131 and lower strip engaging member 132 could vary anywhere along a length of a given sheet-locking member 13;

(III) As shown in FIG. 22B, exemplary sheet-engaging channel 12 comprises a channel track profile that is bound by (i) an inner surface 145 of upper channel side wall 127, (ii) an inner surface 146 of lower channel side wall 128, (iii) an inner surface 147 of upper strip engaging member 131, (iv) an inner surface portion of gap 130, (v) an inner surface 148 of lower strip engaging member 132, and (v) an inner surface 149 opposite gap 130. As further shown in FIG. 22B, exemplary sheet-engaging channel 12 comprises a channel track profile that has a substantially rectangular cross-sectional shape, wherein the track profile height $H_{TP}$ is greater than a track profile width $W_{TP}$, and the track profile height $H_{TP}$ is constant along the track profile width $W_{TP}$. However, it should be understood that sheet-engaging channels 12 suitable for use in the sheet-locking members 13 present invention may have any desired channel track profile with any desired cross-sectional shape. For example, although not shown, channel track profiles could have a cross-sectional pill shape, or a cross-sectional oval shape, or other cross-sectional shape;

(IV) Exemplary mattress 50 shown in FIGS. 18-20 and 26-27 comprises: (A) one or more side sheet portions 54 that extend over and form at least a portion of one or more side surfaces 52 of the mattress 50; and (B) one or more sheet-engaging channels 12 extending along the one or more side sheet portions 54, wherein each sheet-engaging channel 12 comprises a sheet-locking member 13 comprising: (i) an upper (or first) sheet-locking channel member 13U, and (ii) a lower (or second) sheet-locking channel member 13L spaced from said upper sheet-locking channel member 13U, wherein said upper sheet-locking channel member 13U and said lower sheet-locking channel member 13L (a) are designed to engage with one or more sheet-locking strips 30 (and/or accessories 300) inserted within the sheet-locking member 13 and between the upper sheet-locking channel member 13U and the lower sheet-locking channel member 13L, and (b) together provide a channel track profile that extends along a given sheet-locking member 13, wherein the one or more side sheet portions 54 are integral component(s) of the mattress 50, and form at least a portion 52' of said one or more side surfaces 52 of the mattress 50;

(V) Exemplary mattress cover 120 shown in FIGS. 21A and 21C is designed and sized to extend over one or more side surfaces 52 of a mattress 50, said mattress cover 120 comprising: (A) one or more side sheet portions 54 that extend over one or more side surfaces 52 of a mattress 50; and (B) one or more sheet-engaging channels 12 extending along the one or more side sheet portions 54, wherein each sheet-engaging channel 12 comprises a sheet-locking member 13 comprising: (i) an upper (or first) sheet-locking channel member 13U, and (ii) a lower (or second) sheet-locking channel member 13L spaced from said upper sheet-locking channel member 13U, wherein said upper sheet-locking channel member 13U and said lower sheet-locking channel member 13L (a) are designed to engage with one or more sheet-locking strips 30 (and/or accessories 300) inserted within the sheet-locking member 13 and between the upper sheet-locking channel member 13U and the lower sheet-locking channel member 13L, and (b) together provide a channel track profile that extends along a given sheet-locking member 13, wherein the mattress cover 120 is separate from and combinable with a mattress 50 so as to cover at least a portion 52' of the one or more side surfaces 52 of mattress 50;

(VI) Exemplary mattress covering component 110/mattress bands 110' shown in FIGS. 24A-24B are designed and sized to extend over one or more side surfaces 52 of a mattress 50, wherein the mattress band 110' comprises: (A) one or more side sheet portions 54 that extend over one or more side surfaces 52 of a mattress 50; and (B) one or more sheet-engaging channels 12 extending along the one or more side sheet portions 54, wherein each sheet-engaging channel 12 comprises a sheet-locking member 13 comprising: (i) an upper (or first) sheet-locking channel member 13U, and (ii) a lower (or second) sheet-locking channel member 13L spaced from said upper sheet-locking channel member 13U, wherein said upper sheet-locking channel member 13U and said lower sheet-locking channel member 13L (a) are designed to engage with one or more sheet-locking strips 30 (and/or an accessory 300) inserted within the sheet-locking member 13 and between the upper sheet-locking channel member 13U and the lower sheet-locking channel member 13L, and (b) together provide a channel track profile that extends along a given sheet-locking member 13, wherein the mattress band 110' is separate from and combinable with a mattress 50 so as to cover at least a portion 52' of the one or more side surfaces 52 of mattress 50. See again, exemplary mattress band 110' shown in FIGS. 24A-24B; and (VII) Exemplary mattress covering component 110/mattress strip 133' shown in FIG. 25 is designed and sized to extend over one or more side surfaces 52 of a mattress 50, wherein the mattress covering strip portion 133 comprises: (A) one or more strip portions 133 that extend over one or more side surfaces 52 of a mattress 50; and (B) one or more sheet-engaging channels 12 extending along the strip portions 133, wherein each sheet-engaging channel 12 comprises a sheet-locking member 13 comprising: (i) an upper (or first) sheet-locking channel member 13U, and (ii) a lower (or second) sheet-locking channel member 13L spaced from said upper sheet-locking channel member 13U, wherein said upper sheet-locking channel member 13U and said lower sheet-locking channel member 13L (a) are designed to engage with one or more sheet-locking strips 30 (and/or an accessory 300) inserted within the sheet-locking member 13 and between the upper sheet-locking channel member 13U and the lower sheet-locking channel member 13L, and (b) together provide a channel track profile that extends along a given sheet-locking member 13, wherein the mattress covering strip portion 133 is separate from and combinable with a mattress 50 so as to cover at least a portion 52' of the one or more side surfaces 52 of mattress 50. See again, exemplary mattress covering strip portion 133' shown in FIG. 25.

The present invention is described above and further illustrated below by way of additional embodiments, and examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Additional Embodiments:

Accessories Embodiments

1. An accessory 300 capable of connecting to one or more sheet-engaging channels 12 of a bed sheet retention device 100/200/10/40/110/120/50/110'/133, said accessory 300 comprising: (a) at least one accessory connecting member 301, and (b) an accessory body 302 connected to and extending from the at least one accessory connecting member 301, wherein the at least one accessory connecting member 301 comprises an upwardly-extending upper-edge connecting member 317, and a downwardly-extending lower-edge connecting member 318 opposite the upwardly-extending upper-edge connecting member 317, wherein the upwardly-extending upper-edge connecting member 317, and the downwardly-extending lower-edge connecting member 318 are both within a vertically-extending plane P that is substantially parallel with a rear surface 326 of the accessory body 302. As discussed herein, the accessory 300 is configured (i.e., designed) to extend within and connect to one or more sheet-engaging channels 12 of a bed sheet retention device 100/200/10/40/110/120/50/110'/133 so as to position at least a portion of said accessory body 302 (i) above the one or more sheet-engaging channels 12, and/or (ii) below the one or more sheet-engaging channels 12, and/or (iii) within a horizontal plane P containing the one or more sheet-engaging channels 12. For example, the accessory connecting member 301 may be configured (i.e., designed) to extend within and connect to one or more sheet-engaging channels 12 of (1) the bed sheet retention devices disclosed in International Patent Application No. PCT/US2023/079473 (i.e., corner brackets 10), (2) the bed sheet retention devices disclosed in U.S. patent application Ser. No. 18/945,224 filed on Nov. 12, 2024 (i.e., corner brackets 10 and side brackets 40), (3) the bed sheet retention devices disclosed in U.S. patent application Ser. No. 18/986,848 filed on Dec. 19, 2024 (i.e., corner brackets 10 and side brackets 40), and (4) the bed sheet retention devices disclosed in U.S. patent application Ser. No. 19/072,092 filed on Mar. 6, 2025 (i.e., corner brackets 10, side brackets 40, mattress covering components 110, mattress covers 120, mattresses 50, mattress bands 110', and mattress covering strip portion 133), and entitled "BED SHEET RETENTION SYSTEMS, SYSTEM COMPONENTS, AND METHODS OF MAKING AND USING THE SAME," the subject matter of all of which is hereby incorporated in its entirety.

2. The accessory 300 of embodiment 1, wherein said at least one accessory connecting member 301 comprises a single accessory connecting member 301. See, for example, exemplary accessories 300 shown in FIGS. 1A-1B.

3. The accessory 300 of embodiment 1, wherein said at least one accessory connecting member 301 comprises two or more accessory connecting members 301. See, for example, exemplary accessories 300 shown in FIGS. 2A-2B and 10.

4. The accessory 300 of any one of embodiments 1 to 3, wherein each of said at least one accessory connecting member 301 comprises a vertically-extending connecting strip component 303 attached to said accessory body 302.

5. The accessory 300 of any one of embodiments 1 to 4, wherein each of said at least one accessory connecting member 301 comprises a vertically-extending connecting strip component 303 attached to said accessory body 302 via one or more intermediate connecting members 304. See, for example, exemplary accessories 300 shown in FIGS. 1A-2B and 10.

6. The accessory 300 of embodiment 4 or 5, wherein each vertically-extending connecting strip component 303 has a connecting strip component width $W_{CSC}$ of from about 0.1 in to about 1.5 in (or any value between 0.1 in and 1.5 in, in increments of 0.01 in, e.g., 0.52 in, or any range of values between 0.1 in and 1.5 in, in increments of 0.01 in, e.g., from 0.59 in to 1.35 in), and a connecting strip component thickness $T_{CSC}$ of from about 0.05 in to about 3.0 in (or any value between 0.05 in and 3.0 in, in increments of 0.01 in, e.g., 0.07 in, or any range of values between 0.05 in and 3.0 in, in increments of 0.01 in, e.g., from 0.09 in to 0.65 in), and a connecting strip component length $L_{CSC}$ of from about 2.0 in to about 18.0 in (or any value between 2.0 in and 18.0 in, in increments of 0.01 in, e.g., 3.5 in, or any range of values between 2.0 in and 18.0 in, in increments of 0.01 in, e.g., from 3.80 in to 5.65 in).

7. The accessory 300 of any one of embodiments 4 to 6, wherein each vertically-extending connecting strip component 303 has a connecting strip component width $W_{CSC}$ of from about 0.8 in to about 1.2 in, and a connecting strip component thickness $T_{CSC}$ of from about 0.05 in to about 0.08 in, and a connecting strip component length $L_{CSC}$ of from about 4.0 in to about 12.0 in.

8. The accessory 300 of any one of embodiments 4 to 7, wherein each vertically-extending connecting strip component 303 has a connecting strip component width $W_{CSC}$ of about 1.0 in, and a connecting strip component thickness $T_{CSC}$ of about 0.0625 in, and a connecting strip component length $L_{CSC}$ of about 5.5 in.

9. The accessory 300 of any one of embodiments 4 to 8, wherein each vertically-extending connecting strip component 303 has (1) a 0.5 in radius on each connecting strip component corner to make each connecting strip end 305 round, and (2) connecting strip edges 306 that are radiused at about 0.03125 in to provide a smooth finish without corners or edges.

10. The accessory 300 of any one of embodiments 1 to 3, wherein said at least one accessory connecting member 301 comprises two accessory connecting members 301 extending from the rear surface 326 of the accessory body 302 with one of the two accessory connecting members 301 providing the upwardly-extending upper-edge connecting member 317, and the other of the two accessory connecting members 301 providing the downwardly-extending lower-edge connecting member 318.

11. The accessory 300 of embodiment 10, wherein each of the two accessory connecting members 301 comprises a curved connecting member 301 having an arc of curvature along the curved connecting member 301 of about 90 degrees.

12. The accessory 300 of embodiment 10 or 11, wherein an upper edge end 317' of the upwardly-extending upper-edge connecting member 317, and a lower edge end 318' of the downwardly-extending lower-edge connecting member 318 are separated from one another by a distance $W_{CSC}$, and the distance $W_{CSC}$ is less than an overall height of a channel track profile within a sheet-engaging channel 12. See, for example, $W_{CSC}$ shown in FIG. 10.

13. The accessory 300 of embodiment 12, wherein the distance $W_{CSC}$ is greater than a distance $D_{CM}$ between (i) an uppermost portion of one or more intermediate connecting members 304, and (ii) a lowermost portion of the one or more intermediate connecting members 304, the one or more intermediate connecting members 304 connecting the accessory body 302 to the one or more accessory connecting members 301. See again, for example, $D_{CM}$ shown in FIG. 10.

14. The accessory 300 of embodiment 12 or 13, wherein distance $W_{CSC}$ ranges from about 0.1 in to about 1.5 in (or any value between 0.1 in and 1.5 in, in increments of 0.01 in, e.g., 0.52 in, or any range of values between 0.1 in and 1.5 in, in increments of 0.01 in, e.g., from 0.59 in to 1.35 in), and each of the two accessory connecting members 301 has a thickness $T_{CSC}$ of from about 0.05 in to about 3.0 in (or any value between 0.05 in and 3.0 in, in increments of 0.01 in, e.g., 0.07 in, or any range of values between 0.05 in and 3.0 in, in increments of 0.01 in, e.g., from 0.09 in to 0.65 in), and an accessory connecting member length $L_{CSC}$ of from about 2.0 in to about 18.0 in (or any value between 2.0 in and 18.0 in, in increments of 0.01 in, e.g., 3.5 in, or any range of values between 2.0 in and 18.0 in, in increments of 0.01 in, e.g., from 3.80 in to 5.65 in).

15. The accessory 300 of any one of embodiments 12 to 14, wherein distance $W_{CSC}$ ranges from about 0.8 in to about 1.2 in, and each of the two accessory connecting members 301 has a thickness $T_{CSC}$ of from about 0.05 in to about 0.08 in, and an accessory connecting member length $L_{CSC}$ of from about 4.0 in to about 12.0 in.

16. The accessory 300 of any one of embodiments 4 to 7, wherein distance $W_{CSC}$ is about 1.0 in, and each of the two accessory connecting members 301 has a thickness $T_{CSC}$ of about 0.0625 in, and an accessory connecting member length $L_{CSC}$ of about 5.5 in.

17. The accessory 300 of any one of embodiments 5 to 16, wherein each of (i) said at least one accessory connecting member 301, (ii) said accessory body 302, and (iii) said one or more intermediate connecting members 304 independently comprises a polymeric material with or without fillers/reinforcements. Suitable fillers/reinforcements include, but are not limited to, glass fibers, glass powder/particles, carbon fibers, aramid fibers, other polymeric fibers, one or more fabrics (e.g., woven fabrics, nonwoven fabrics, etc.) made from any of the herein-described materials, or any combination thereof.

18. The accessory 300 of any one of embodiments 5 to 17, wherein each of (i) said at least one accessory connecting member 301, (ii) said accessory body 302, and (iii) said one or more intermediate connecting members 304 independently comprises a polymeric material with fillers/reinforcements therein.

19. The accessory 300 of any one of embodiments 5 to 18, wherein each of (i) said at least one accessory connecting member 301, (ii) said accessory body 302, and (iii) said one or more intermediate connecting members 304 independently comprises an acrylic material or a polycarbonate material.

20. The accessory 300 of any one of embodiments 5 to 19, wherein each of (i) said at least one accessory connecting member 301, (ii) said accessory body 302, and (iii) said one or more intermediate connecting members 304 independently comprises an acrylic material.

21. The accessory 300 of any one of embodiments 5 to 20, wherein each of (i) said at least one accessory connecting member 301, (ii) said accessory body 302, and (iii) said one or more intermediate connecting members 304 independently comprises glass fibers, glass powder/particles, and/or one or more glass fiber containing fabrics.

22. The accessory 300 of any one of embodiments 1 to 21, wherein said accessory body 302 is connected to said at least one accessory connecting member 301 so that a portion or all of said accessory body 302 is positioned above said at least one accessory connecting member 301. See, for example, exemplary accessory 300 in FIG. 4.

23. The accessory 300 of any one of embodiments 1 to 22, wherein said accessory body 302 is connected to said at least one accessory connecting member 301 so that a portion or all of said accessory body 302 is positioned below said at least one accessory connecting member 301.

24. The accessory 300 of any one of embodiments 1 to 23, wherein said accessory body 302 comprises an accessory body surface 308 that is structurally capable of supporting an object (not shown) resting on and/or connected to the accessory body surface 308.

25. The accessory 300 of any one of embodiments 1 to 24, wherein said accessory body 302 comprises an accessory body surface 308 that is structurally capable of supporting an object (not shown) resting on and/or connected to the accessory body surface 308, wherein the object comprises one or more of a book, a drink container (e.g., a cup or glass or bottle), a food container (e.g., a plate of food), a computer pad, a laptop computer, a cell phone, a lamp, a television remote, an air freshener, a picture frame, vehicle keys, etc., or any combination thereof.

26. The accessory 300 of any one of embodiments 1 to 25, wherein a position of said accessory body 302 relative to said at least one accessory connecting member 301 is adjustable within a horizontal plane $P_H$. For example, the accessory body 302 can be moved towards or away from the at least one accessory connecting member 301 within a given horizontal plane $P_H$.

27. The accessory 300 of any one of embodiments 1 to 26, wherein a position of said accessory body 302 relative to said at least one accessory connecting member 301 is adjustable within a vertical plane $P_V$. For example, the accessory body 302 can be moved up or down relative to the at least one accessory connecting member 301 within a given horizontal plane $P_H$.

28. The accessory 300 of any one of embodiments 1 to 27, wherein a position of said accessory body 302 relative to said at least one accessory connecting member 301 is adjustable within a horizontal plane $P_H$ and a vertical plane $P_V$.

29. The accessory 300 of any one of embodiments 5 to 28, wherein said one or more intermediate connecting members 304 comprises a connecting arm 307 extending between said accessory body 302 and said at least one accessory connecting member 301.

30. The accessory 300 of any one of embodiments 5 to 29, wherein said one or more intermediate connecting members 304 comprises a jointed connecting arm 307' extending between said accessory body 302 and said at least one accessory connecting member 301, said jointed connecting arm 307' (a) comprising one or more joints 309, and (b) enabling movement of said accessory body 302 so that a position of said accessory body 302 relative to said at least one accessory connecting member 301 is adjustable within (i) a horizontal plane $P_H$, (ii) a vertical plane $P_V$, or (iii) both a horizontal plane $P_H$, and a vertical plane $P_V$. Sec, for example, exemplary accessory 300 shown in FIGS. 5A-5B, wherein a portion of said accessory body 302 (e.g., accessory body surface 308) is positioned within a storage range $D_{RS}$ (i.e., a portion of accessory body 302 (e.g., accessory body surface 308) is within the range $D_{RS}$ shown in FIG. 5A during storage), but may be positioned anywhere within use range $D_{RU}$ shown in FIG. 5B).

31. The accessory 300 of any one of embodiments 5 to 30, wherein at least one joint 309 of said one or more joints 309 comprises a joint 309' that allows rotation of a portion of said accessory body 302 (e.g., accessory body surface 308) along a line extending through the joint 309'. See again, for example, exemplary accessory 300 shown in FIG. 29B with joint 309' proximate accessory body surface 308.

Figure 6A:
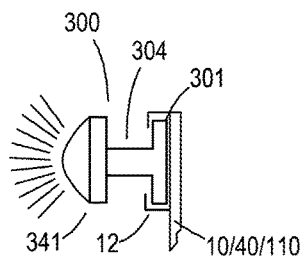
FIGS. 6A-6H depict side views of various exemplary accessories suitable for use with bed sheet retention devices, and in bed sheet retention systems.
Figure 6B:
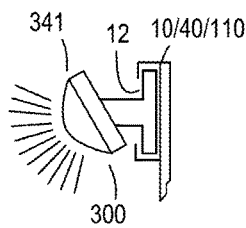
Figure 6C:
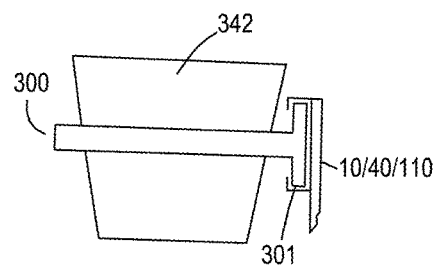
Figure 6D:
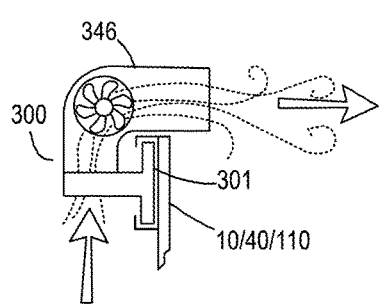
Figure 6E:
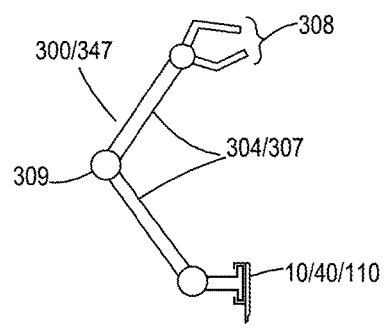
Figure 6F:
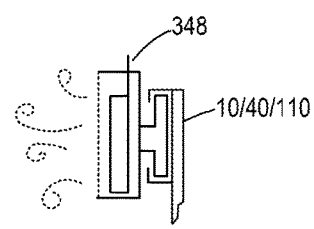
Figure 6G:
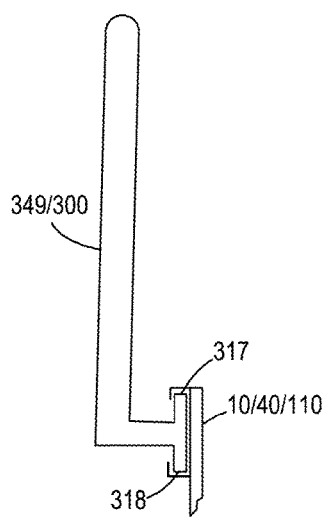
Figure 6H:
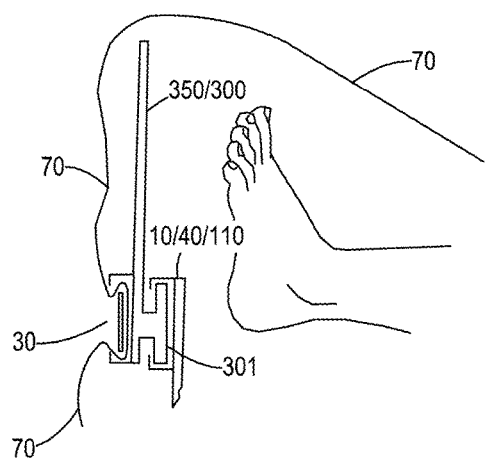
Figure 7:
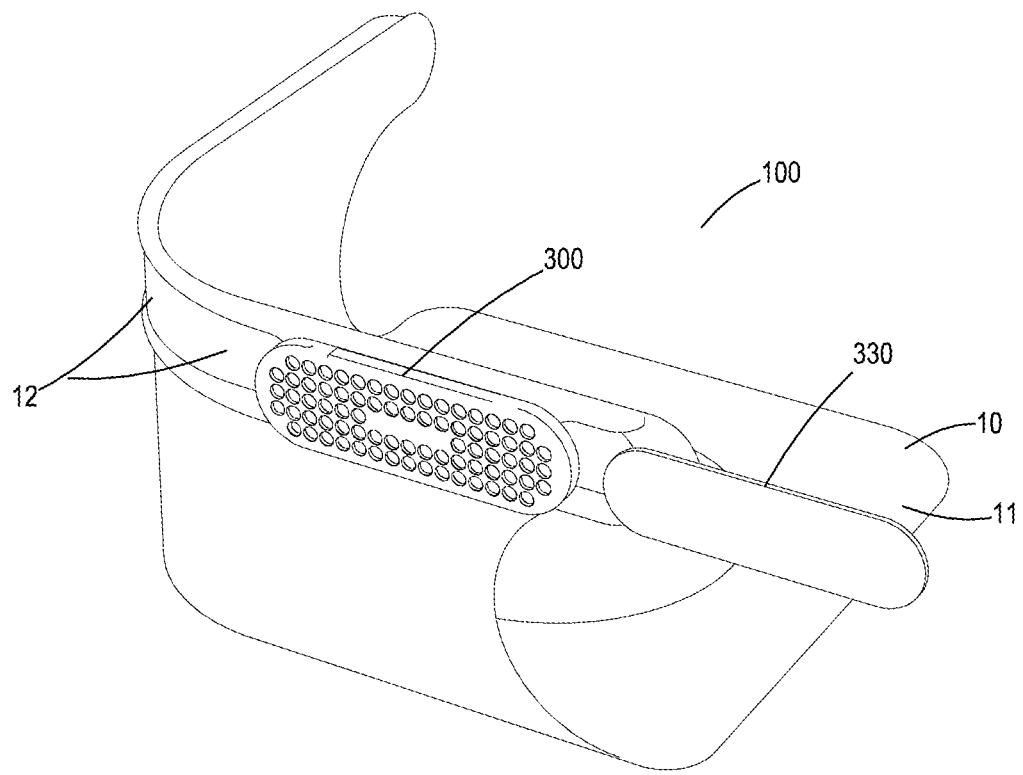
FIG. 7 depicts a perspective view of another exemplary accessory attached to a corner bracket of a bed sheet retention system, with a fragrance-providing strip shown prior to insertion into the exemplary accessory.
Figure 8:
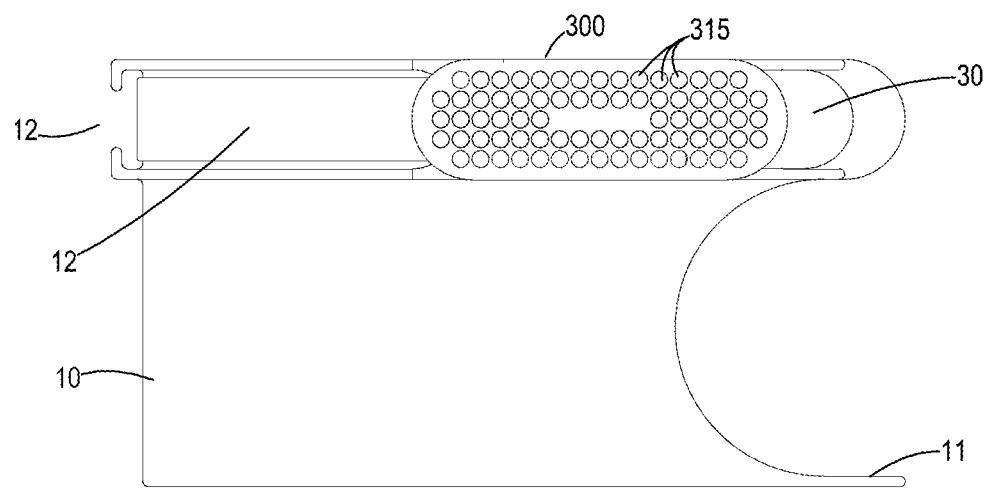
FIG. 8 depicts a side view of the exemplary accessory attached to the corner bracket of the bed sheet retention system shown in FIG. 7, with the fragrance-providing strip inserted within the exemplary accessory.
Figure 9:
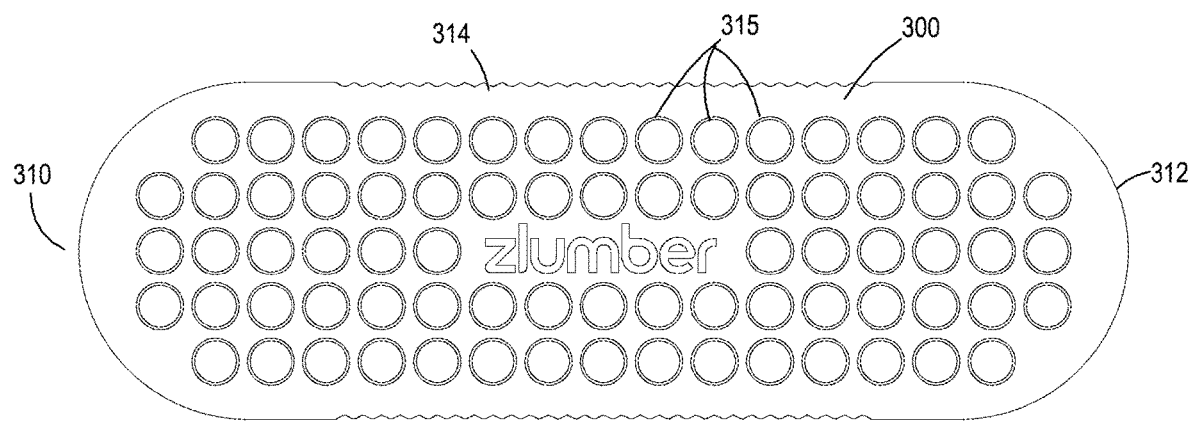
FIG. 9 depicts a front view of the exemplary accessory shown in FIG. 7.
Figure 10:
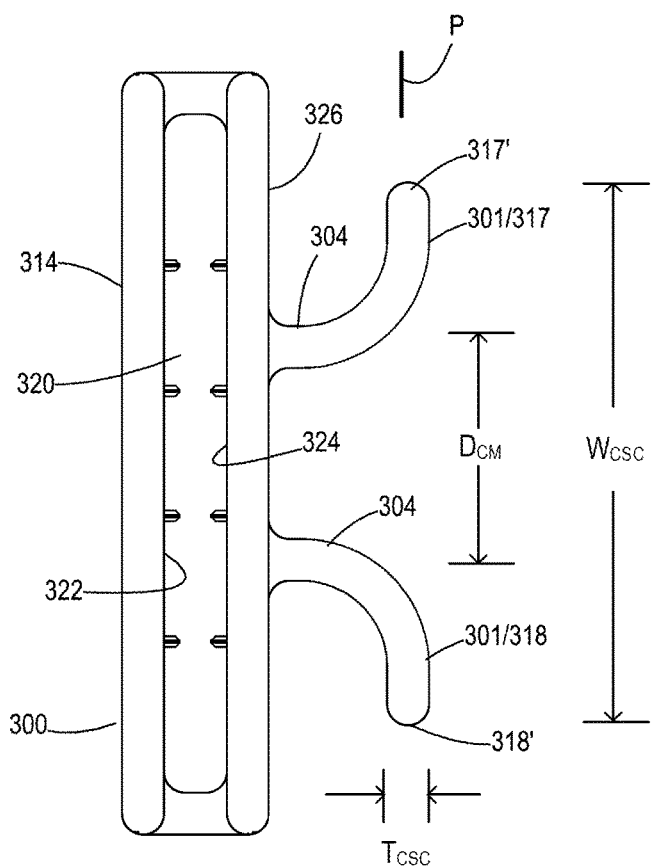
FIG. 10 depicts a right-side view of the exemplary accessory shown in FIG. 7.
Figure 11:
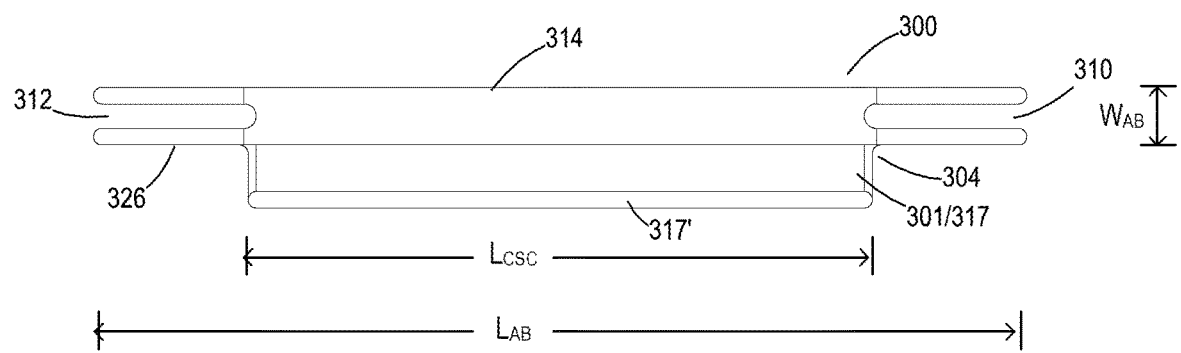
FIG. 11 depicts a top view of the exemplary accessory shown in FIG. 7.
Figure 12:
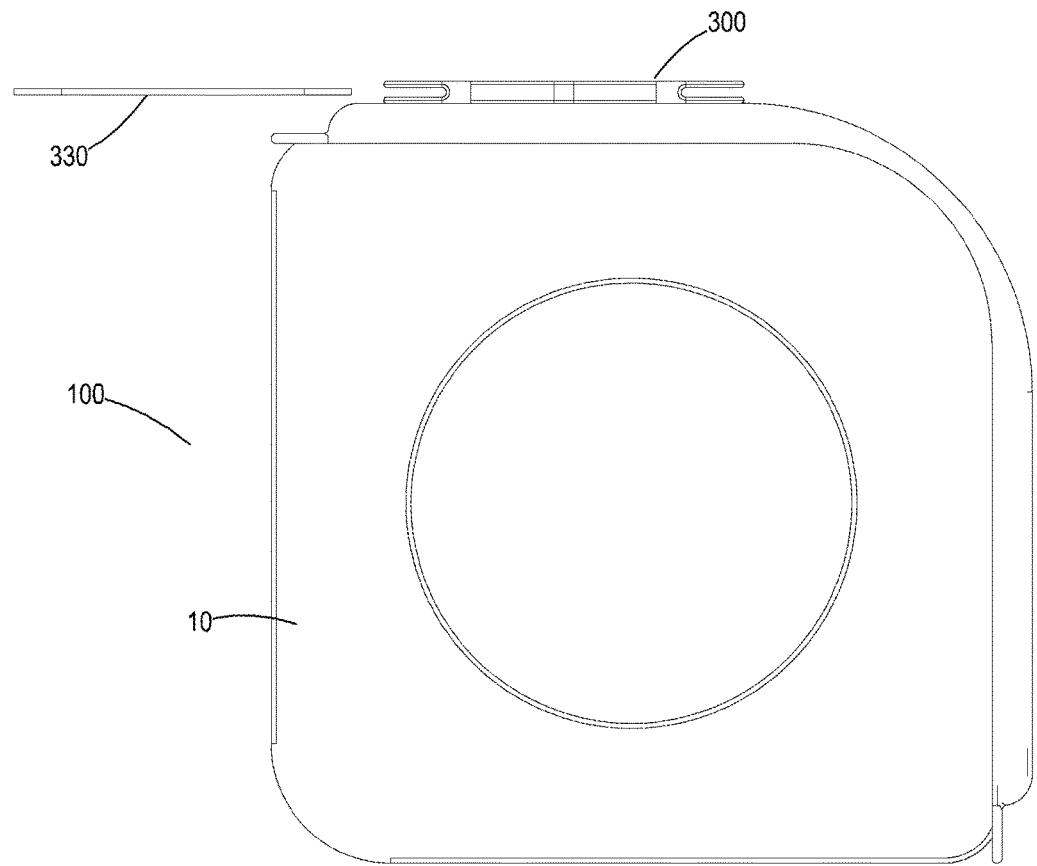
FIG. 12 depicts a top view of the bed sheet retention system shown in FIG. 7.
Figure 13:
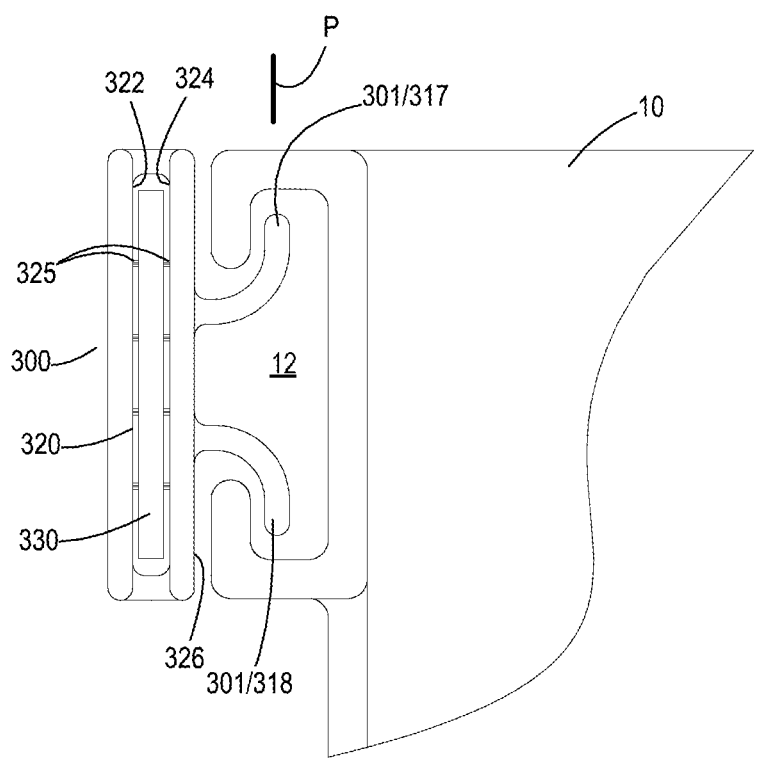
FIG. 13 depicts a close-up right-side view of the exemplary accessory attached to the corner bracket of the bed sheet retention system shown in FIG. 7, with the fragrance-providing strip inserted within the exemplary accessory.
Figure 14:
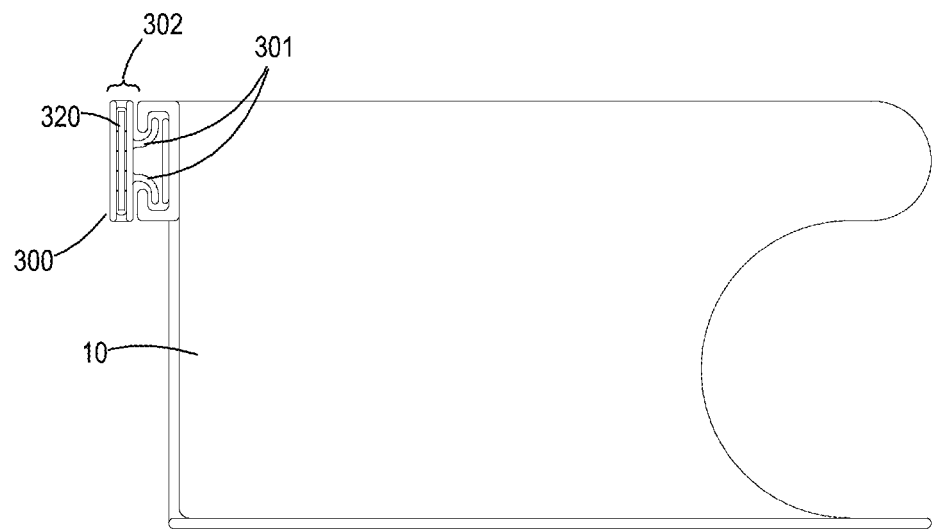
FIG. 14 depicts another right-side view of the exemplary accessory attached to the corner bracket of the bed sheet retention system shown in FIG. 7, with the fragrance-providing strip inserted within the exemplary accessory, and a sheet locking strip positioned within the sheet-engaging channel of the corner bracket.
Figure 15:
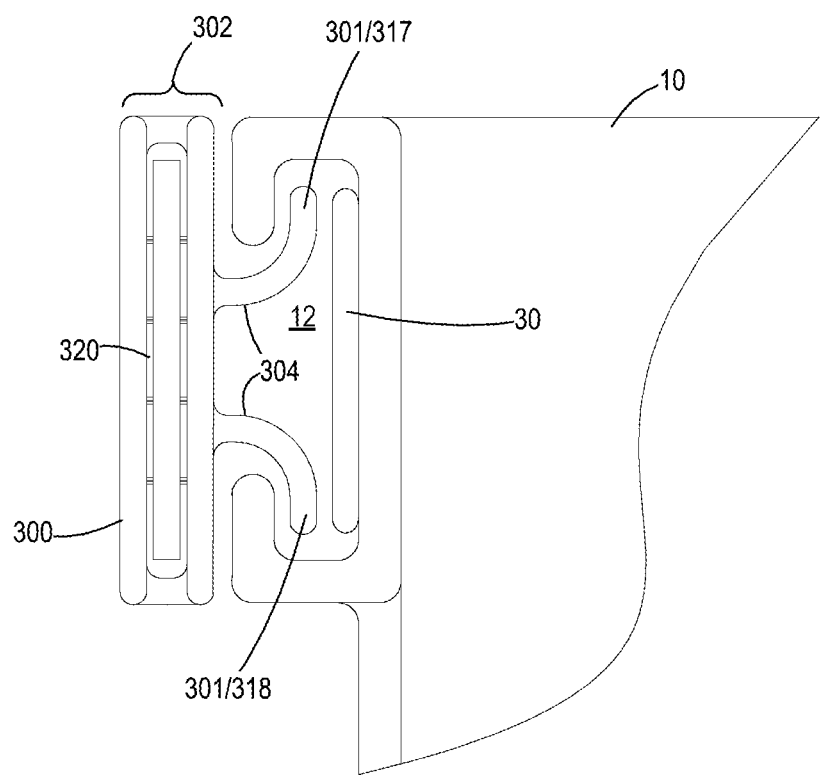
FIG. 15 depicts a close-up right-side view of the exemplary accessory attached to the corner bracket of the bed sheet retention system shown in FIG. 14, with the fragrance-providing strip inserted within the exemplary accessory, and a sheet locking strip positioned within the sheet-engaging channel of the corner bracket.

32. The accessory 300 of any one of embodiments 1 to 31, wherein said accessory body 302 comprises one or more features selected from: (i) a ledge or rim 313 (see, FIG. 3A) extending along an accessory body surface 308 of said accessory body 302, (ii) a hole 311 extending through an accessory body surface 308 of said accessory body 302, (iii) a clip or clamping member (not shown) suitable for fastening an object (e.g., a book, a phone, a computer pad or tablet, etc.) to an accessory body surface 308 of said accessory body 302, (iv) a clothes hanger for hanging one or more items of clothing (not shown), (v) a towel rack for hanging one or more towels (not shown), (vi) a scented or scent-generating component to provide a scent in the area near accessory body 302, (vii) a cup-/glass-holding feature (see, exemplary cup-holding accessory 300 shown in FIGS. 2A-2B, and exemplary cup-holder accessory 300 holding cup 342 shown in FIG. 6C, (viii) a bedside holster (i.e., for a hand gun or long gun), (ix) a bedside light/lamp 341 as shown in FIG. 6A or FIG. 6B, a fan 346 as shown in FIG. 6D, an articulated arm 347 as shown in FIG. 6E, a scent pod 348 as shown in FIG. 6F, a bed railing 349 as shown in FIG. 6G, a kickstand component 346 as shown in FIG. 6H, or any combinations thereof. It should be noted that any of the above-described accessories 300 could further comprise another sheet-engaging channel 12 along an outer surface of the accessory 300 similar to kickstand component 346 shown in FIG. 6H. For example, fan 346 shown in FIG. 6D could have a sheet-engaging channel 12 along body accessory 302 opposite the accessory connecting member 301. Such configurations can result in parallel sheet-engaging channels 12 within a horizontal plane such as horizontally-extending plane P.

33. The accessory 300 of any one of embodiments 1 to 32, wherein said accessory body 302 comprises one or more electronic components therein and/or thereon (not shown), the one or more electronic components comprising one or more of (i) a phone charging outlet, (ii) a 120V outlet (e.g., a standard home outlet), (iii) a music-generating device (e.g., a music speaker and/or Bluetooth component), (iv) a television screen or computer screen, (v) a charging pad (i.e., induction charging), and/or (vi) a medical device (e.g., to monitor a patient, to display patient information, etc.).

34. The accessory 300 of any one of embodiments 1 to 33, wherein said accessory body 302 has an accessory body width $W_{AB}$ of from about 0.5 in to about 18.0 in, an accessory body length $L_{AB}$ of from about 0.5 in to about 24.0 in, and an accessory body thickness $T_{AB}$ of from about 0.25 in to about 12.0 in, depending on the overall shape and configuration of the accessory body 302. For example, when the accessory body 302 comprises a bedside tabletop accessory 300, such as shown in FIGS. 1A-1B, the accessory body 302 will typically have a larger accessory body width $W_{AB}$, a larger accessory body length $L_{AB}$, and a smaller accessory body thickness $T_{AB}$ when compared to the accessory body 302 of cup-holding accessory 300 shown in FIGS. 2A-2B. It should be understood that a given accessory body 302 can have any desired accessory body width $W_{AB}$, any desired accessory body length $L_{AB}$, and any desired accessory body thickness $T_{AB}$ as long as the resulting accessory body 302 is supported by the at least one accessory connecting member 301 positioned within the one or more sheet-engaging channels 12 of bracket 10/40 of bed sheet retention device 100/200.

35. The accessory 300 of any one of embodiments 1 to 34, wherein said accessory body 302 has an accessory body width $W_{AB}$ of from about 4.0 in to about 14.0 in, an accessory body length $L_{AB}$ of from about 4.0 in to about 16.0 in, and an accessory body thickness $T_{AB}$ of from about 0.5 in to about 6.0 in, depending on the overall shape and configuration of the accessory body 302.

36. The accessory 300 of any one of embodiments 1 to 35, wherein said accessory body 302 has an accessory body width $W_{AB}$ of from about 6.0 in to about 12.0 in, an accessory body length $L_{AB}$ of from about 6.0 in to about 12.0 in, and an accessory body thickness $T_{AB}$ of from about 0.5 in to about 3.0 in, depending on the overall shape and configuration of the accessory body 302.

37. The accessory 300 of any one of embodiments 1 to 36, wherein said accessory body 302 comprises an accessory body surface 308 having an accessory body outer periphery 315, and one or more accessory body connectors 314 positioned along said accessory body outer periphery 315, said one or more accessory body connectors 314 enabling connection of one or more accessory body components to said accessory body 302. See, for example, exemplary accessory 300 shown in FIG. 3A.

38. The accessory 300 of embodiment 37, wherein said one or more accessory body connectors 314 comprises a single accessory body connector 314 extending along said accessory body outer periphery 315.

39. The accessory 300 of embodiment 37 or 38, further comprising one or more attachable connectors 316, each of the one or more attachable connectors 316 being designed to attach/connect to and detach/disconnect from said one or more accessory body connectors 314. Sec, for example, exemplary accessory 300 and exemplary attachable connector 316 shown in FIGS. 3A-3B.

40. The accessory 300 of any one of embodiments 37 to 39, further comprising one or more attachable materials 318, each of the one or more materials 318 being designed to attach/connect to and detach/disconnect from said one or more accessory body connectors 314 via one or more attachable connectors 316. See, for example, exemplary attachable material 318, namely, skirt 318, shown in FIG. 3C. Also, see exemplary accessory 300 in FIGS. 3D-3E, wherein exemplary attachable material 318, namely, skirt 318, is attached to single accessory body connector 314 along accessory body outer periphery 315 via attachable connector 316, As shown in this embodiment, attachable connector 316 clamps over a portion of skirt 318 onto single accessory body connector 314 of accessory body 302.

41. The accessory 300 of any one of embodiments 1 to 40, wherein said accessory 300 further comprise at least one sheet-engaging channel 12 along an outer surface of the accessory 300. See for example, kickstand component 346 shown in FIG. 6H.

42. The accessory 300 of any one of embodiments 1 to 41, wherein said accessory 300 is attachable or attached to a bracket 10/40 of a bed sheet retention device 100/200 so as to position at least a portion of said accessory body 302 (i) above the one or more sheet-engaging channels 12, and/or (ii) below the one or more sheet-engaging channels 12, and/or (iii) within a horizontal plane P containing the one or more sheet-engaging channels 12.

43. The accessory 300 of any one of embodiments 1 to 42, wherein said accessory 300 is attached to a bracket 10/40 comprising the corner bracket 10 described in embodiments 9 to 59 of (1) U.S. patent application Ser. No. 18/945,224, (2) U.S. patent application Ser. No. 18/986,848, and (3) U.S. patent application Ser. No. 19/072,092, the subject matter of all of which is hereby incorporated by reference in its entirety.

44. The accessory 300 of any one of embodiments 1 to 43, wherein said accessory 300 is attachable or attached to a bracket 10/40 comprising the side bracket 40 described in embodiments 60 to 105 of (1) U.S. patent application Ser. No. 18/945,224, (2) U.S. patent application Ser. No. 18/986, 848, and (3) U.S. patent application Ser. No. 19/072,092, the subject matter of all of which is hereby incorporated by reference in its entirety.

45. The accessory 300 of any one of embodiments 1 to 44, wherein said accessory 300 is attachable or attached to a mattress covering component 110, or a mattress cover 120, or a mattress 50, or a mattress band 110', or a mattress covering strip portion 133 as described in embodiments 106 to 219 of U.S. patent application Ser. No. 19/072,092, the subject matter of which is hereby incorporated by reference in its entirety.

46. The accessory 300 of any one of embodiments 1 to 45, wherein said accessory 300 comprises a scented or scent-generating component 330 that provides a scent in an area near accessory body 302.

47. An accessory 300 capable of connecting to one or more sheet-engaging channels 12 of a bed sheet retention device 100/200/10/40/110/120/50/110'/133, said accessory 300 comprising: (a) at least one accessory connecting member 301, and (b) an accessory body 302 connected to and extending from the at least one accessory connecting member 301, wherein the at least one accessory connecting member 301 comprises an upwardly-extending upper-edge connecting member 317, and a downwardly-extending lower-edge connecting member 318 opposite the upwardly-extending upper-edge connecting member 317, wherein the upwardly-extending upper-edge connecting member 317, and the downwardly-extending lower-edge connecting member 318 are both within a vertically-extending plane P that is substantially parallel with a rear surface 326 of the accessory body 302, said accessory 300 comprising a scented component 330 or a scent-generating component 330 that provides a scent in an area near the accessory body 302. As discussed herein, the accessory 300 is configured (i.e., designed) to extend within and connect to one or more sheet-engaging channels 12 of (1) a bracket 10/40 of a bed sheet retention device 100/200, or (2) a mattress covering component 110, or (3) a mattress cover 120, or (4) a mattress 50, or (5) a mattress band 110', or (6) a mattress covering strip portion 133 so as to position at least a portion of said accessory body 302 (i) above the one or more sheet-engaging channels 12, and/or (ii) below the one or more sheet-engaging channels 12, and/or (iii) within a horizontal plane P containing the one or more sheet-engaging channels 12.

48. The accessory 300 of embodiment 47, wherein said accessory 300 comprises one or more features as described in one or more of embodiments 2 to 45.

49. An accessory 300 capable of connecting to a surface proximate or on a bed mattress 50, said accessory 300 comprising: (a) at least one accessory connecting member 301', and (b) an accessory body 302 connected to and extending from the at least one accessory connecting member 301', wherein the at least one accessory connecting member 301' is configured (i.e., designed) to connect to a bed sheet retention device 100/200, or a bed mattress 50, or an object proximate a bed mattress 50 (e.g., a bed side table, a bed frame/head board/foot board, a wall surface near a bed mattress 50, etc.), and accessory body 302 comprises an accessory channel 320 having an accessory channel track profile that extends along a length $L_{AB}$ of the accessory body 302, said accessory channel being sized and designed to accept a scented component 330 or scent-generating component 330 therethrough.

50. The accessory 300 of embodiment 49, wherein said at least one accessory connecting member 301' comprises an adhesive, or a magnet, or a hook and loop material (e.g., VELCRO® material). For example, in some embodiments, the accessory 300 comprises an adhesive layer (not shown) along a rear surface 326 (i.e., instead of accessory connecting member 301). In these embodiments, a release liner (not shown) may be removed from the adhesive layer, and the accessory 300 then attached to a surface near or on a bed mattress 50. In other embodiments, the accessory 300 comprises a magnet (not shown) along a rear surface 326 (i.e., instead of accessory connecting member 301). In these embodiments, a corresponding magnet (not shown) can be positioned along one side of a sheet 70, with the accessory 300 then attached so that the sheet 70 is positioned between magnets. In other embodiments, the accessory 300 comprises a hook or loop material (not shown) along a rear surface 326 (i.e., instead of accessory connecting member 301). In these embodiments, the hook or loop material of the accessory 300 is used to attach the accessory 300 to a corresponding loop or hook material on a surface near or on a bed mattress 50.

51. The accessory 300 of embodiment 50, wherein said accessory 300 comprises one or more features as described in one or more of embodiments 1 to 46.

52. The accessory 300 of embodiment 49 or 51, wherein the accessory 300 further comprises at least one accessory connecting member 301, wherein the at least one accessory connecting member 301 comprises an upwardly-extending upper-edge connecting member 317, and a downwardly-extending lower-edge connecting member 318 opposite the upwardly-extending upper-edge connecting member 317, wherein the upwardly-extending upper-edge connecting member 317, and the downwardly-extending lower-edge connecting member 318 are both within a vertically-extending plane P that is substantially parallel with a rear surface 326 of the accessory body 302. The accessory 300 is configured (i.e., designed) to extend within and connect to one or more sheet-engaging channels 12 of (1) a bracket 10/40 of a bed sheet retention device 100/200, or (2) a mattress covering component 110, or (3) a mattress cover 120, or (4) a mattress 50, or (5) a mattress band 110', or (6) a mattress covering strip portion 133 so as to position at least a portion of said accessory body 302 (i) above the one or more sheet-engaging channels 12, and/or (ii) below the one or more sheet-engaging channels 12, and/or (iii) within a horizontal plane P containing the one or more sheet-engaging channels 12.

53. The accessory 300 of any one of embodiments 1 to 48 and 51 to 52, wherein said at least one accessory connecting member 301 comprises two accessory connecting members 301 with one accessory connecting member 301 being configured to extend within an upper sheet-locking channel member 13U of the one or more sheet-locking members 13, and the other accessory connecting member 301 being configured to extend within a lower sheet-locking channel member 13L of the one or more sheet-locking members 13, the lower sheet-locking channel member 13L being positioned below and spaced from the upper sheet-locking channel member 13U.

54. The accessory 300 of any one of embodiments 46 to 53, wherein said accessory body 302 is said scented component 330 or said scent-generating component 330.

55. The accessory 300 of any one of embodiments 1 to 54, wherein said accessory body 302 comprises an outer surface 314 opposite said at least one accessory connecting member 301.

56. The accessory 300 of any one of embodiments 1 to 55, wherein said accessory body 302 comprises an outer surface 314 opposite said at least one accessory connecting member 301, said outer surface 314 having one or more holes 315 therein.

57. The accessory 300 of any one of embodiments 1 to 48 and 55 to 56, wherein said accessory body 302 comprises an accessory channel 320 having an accessory channel track profile that extends along a length $L_{AB}$ of the accessory body 302, said accessory channel 320 being sized and designed to accept a scented component 330 or scent-generating component 330 therethrough.

58. The accessory 300 of any one of embodiments 1 to 57, wherein said accessory body 302 comprises an accessory channel 320 extending within said accessory body 302 from a first outer edge end 310 of said accessory body 302 to an opposite second outer edge end 312 of said accessory body 302 (i.e., across a length $L_{AB}$ of the accessory body 302).

59. The accessory 300 of any one of embodiments 56 to 58, wherein said one or more holes 315 extend from said outer surface 314 to an inner surface 322 of said accessory channel 320.

60. The accessory 300 of any one of embodiments 49 to 59, wherein said accessory channel 320 comprises one or more channel surface undulations 325 along one or both opposing inner surfaces 322/324 of said accessory channel 320.

61. The accessory 300 of any one of embodiments 46 to 60, wherein said scented component 330 or said scent-generating component 330 comprises a scented strip 330 that is sized and designed to connect to or attach to said accessory body 302.

62. The accessory 300 of any one of embodiments 46 to 61, wherein said scented component 330 or said scent-generating component 330 comprises a scented strip 330 that is sized and designed to extend within said accessory channel 320.

63. The accessory 300 of embodiment 61 or 62, wherein said scented strip 330 is coated and/or impregnated with a scent-producing (or scent-providing) material (e.g., a fragrance, a mint scent, an all-natural insect repellent, etc.). Suitable scent-producing or scent-providing materials include, but are not limited to, lavender, chamomile, sandalwood, vanilla, jasmine, cedarwood, bergamot, ylang-ylang, frankincense, clary sage, patchouli, rose, cinnamon, black pepper, ginger, clove, *eucalyptus*, peppermint, tea tree, rosemary, pine, camphor, oregano, thyme, citronella, lemongrass, bay leaves, lemon, basil, myrrh, ammonia, or any combination thereof. Each of these scents provides one or more primary or secondary effects selected from (i) promotes deep sleep and relaxation, (ii) reduces anxiety, (iii) alleviates stress, (iv) supports emotional balance, (v) supports sleep, (vi) helps with emotional relaxation, (vii) supports meditation, (viii) reduces mental fatigue, (ix) uplifts mood, (x) boosts sensuality, (xi) snoring reduction, (xii) insomnia relief, etc.

64. The accessory 300 of any one of embodiments 61 to 63, wherein said scented strip 330 acts as a vessel/carrier for a scent-producing (or scent-providing) material (e.g., a fragrance, a mint scent, an all-natural insect repellant, any of the materials listed in embodiment 63, etc.).

65. The accessory 300 of embodiments 63 or 64, wherein said scent-producing material is a liquid, a solid, or a gel material. See again, the list of suitable materials in embodiment 63.

Bed Sheet Retention Systems and Kit Embodiments

66. A bed sheet retention system (or kit) 1000 comprising: (I) one or more of the herein-described accessories 300.

67. The bed sheet retention system (or kit) 1000 of embodiment 66, wherein the bed sheet retention system (or kit) 1000 comprises: (I) two or more of the herein-described accessories 300.

68. The bed sheet retention system (or kit) 1000 of embodiment 66 or 67, wherein each of the accessories 300 comprises an accessory of any one of embodiments 1 to 65.

69. The bed sheet retention system (or kit) 1000 of any one of embodiments 66 to 68, further comprising: (II) one or more corner brackets 10 as described in embodiments 9 to 59 of (1) U.S. patent application Ser. No. 18/945,224, (2) U.S. patent application Ser. No. 18/986,848, and (3) U.S. patent application Ser. No. 19/072,092, the subject matter of all of which is hereby incorporated by reference in its entirety.

70. The bed sheet retention system (or kit) 1000 of embodiment 69, wherein the one or more corner brackets 10 comprises four or more corner brackets 10.

71. The bed sheet retention system (or kit) 1000 of any one of embodiments 66 to 69, further comprising: (II) at least one side bracket 40 as described in embodiments 60 to 105 of (1) U.S. patent application Ser. No. 18/945,224, (2) U.S. patent application Ser. No. 18/986,848, and (3) U.S. patent application Ser. No. 19/072,092, the subject matter of all of which is hereby incorporated by reference in its entirety.

72. The bed sheet retention system (or kit) 1000 of embodiment 71, wherein said at least one side bracket 40 comprises two or more side brackets 40 (e.g., from 2 to 8 side brackets 40).

73. The bed sheet retention system (or kit) 1000 of any one of embodiments 66 to 72, further comprising: (II) a mattress covering component 110, or a mattress cover 120, or a mattress 50, or a mattress band 110', or a mattress covering strip portion 133 as described in embodiments 106 to 219 of U.S. patent application Ser. No. 19/072,092, the subject matter of which is hereby incorporated by reference in its entirety.

74. The bed sheet retention system (or kit) 1000 of any one of embodiments 66 to 72, further comprising: (III) one or more of the herein-described sheet locking strips 30.

75. The bed sheet retention system (or kit) 1000 of embodiment 674, wherein said one or more sheet locking strips 30 comprises four or more sheet locking strips 30.

It should be understood that the bed sheet retention systems (or kits) 1000 of the present invention may comprise one or more additional system/kit components. Suitable additional system/kit components include, but are not limited to, one or more bed sheets 70, one or more sheet connectors (not shown) other than said sheet locking strips 30, one or more bedmaking tool/mattress-lift tools as described in U.S. patent application Ser. No. 17/983,628, filed on Nov. 9, 2022, and entitled "BEDMAKING TOOLS AND METHODS OF MAKING AND USING THE SAME," the subject matter of which is hereby incorporated by reference in its entirety, one or more bungee cord-type connectors (not shown) that can be used to attached two bed sheet retention devices 100 to one another, diagonally, under a given mattress 50 (i.e., connecting two diagonally opposed bed sheet retention devices 100 to one another via the at least one aperture 20 within each bed sheet retention device 100), and any combination thereof.

Methods of Making Accessories Embodiments

76. A method of making the accessories 300 of any one of embodiments 1 to 65, said method comprising: forming the accessory 300 utilizing one or more steps comprising: one or more thermoforming steps (e.g., a molding steps); one or more machining steps (e.g., one or more drilling, cutting, stamping, sanding, abrading, etc., steps); and one or more assembling steps.

77. The method of embodiment 76, wherein said forming step comprises: one or more thermoforming steps (e.g., a molding steps).

78. The method of embodiment 76 or 77, wherein said forming step comprises: a single thermoforming step (e.g., a molding step).

Methods of Using Accessories Embodiments

79. A method of using the accessory 300 of any one of embodiments 1 to 48 and 51 to 65, said method comprising: attaching one or more of the herein-described accessories 300 of any one of embodiments 1 to 58 to the one or more sheet-engaging channels 12 of (1) a bracket 10/40 of a bed sheet retention device 100/200, or (2) a mattress covering component 110, or (3) a mattress cover 120, or (4) a mattress 50, or (5) a mattress band 110', or (6) a mattress covering strip portion 133 via the at least one accessory connecting member 301 of the one or more of the herein-described accessories 300.

80. The method of embodiment 79, further comprising: adjusting a position of the accessory body 302 of the accessory 300 relative to the one or more sheet-engaging channels 12 of (1) the bracket 10/40, or (2) the mattress covering component 110, or (3) the mattress cover 120, or (4) the mattress 50, or (5) the mattress band 110', or (6) the mattress covering strip portion 133.

81. The method of embodiment 79 or 80, further comprising: detaching the one or more accessories 300 from the one or more sheet-engaging channels 12 of (1) the bracket 10/40, or (2) the mattress covering component 110, or (3) the mattress cover 120, or (4) the mattress 50, or (5) the mattress band 110', or (6) the mattress covering strip portion 133.

82. The method of any one of embodiments 79 to 81, further comprising: inserting a scented strip 330 within an accessory channel 320 extending within the accessory body 302 from a first outer edge end 310 of the accessory body 302 to an opposite second outer edge end 312 of the accessory body 302.

83. The method of any one of embodiments 79 to 82, further comprising: replacing a used scented strip 330 positioned within an accessory channel 320 of the accessory body 302 with a replacement scented strip 330 by inserting the replacement scented strip 330 within the accessory channel 320 to push the used scented strip 330 out of the accessory channel 320.

84. A method of using the accessory 300 of embodiment 49 or 50, said method comprising: attaching the accessory 300 of embodiment 49 or 50 to a bed sheet retention device 100/200, or a bed mattress 50, or an object proximate a bed mattress 50 (e.g., a bed side table, a bed frame/head board/foot board, a wall surface near a bed mattress 50, etc.); and inserting a scented strip 330 within the accessory channel 320 of the accessory body 302.

85. The method of embodiment 84, wherein said attaching step comprises: using an adhesive (not shown) to attach the accessory 300 to the bed sheet retention device 100/200, or the bed mattress 50, or the object proximate a bed mattress 50.

86. The method of embodiment 85, wherein said attaching step comprises: using a set of magnets (not shown) to attach the accessory 300 to the bed sheet retention device 100/200, or the bed mattress 50, or the object proximate a bed mattress 50, or a bed sheet 70.

87. The method of embodiment 84, wherein said attaching step comprises: attaching the accessory 300 to the bracket 10/40 of a bed sheet retention device 100/200, or the bed mattress 50, or the object proximate a bed mattress 50 via one or more sheet-engaging channels 12 of (1) the bracket 10/40 of a bed sheet retention device 100/200, or (2) the mattress covering component 110, or (3) the mattress cover 120, or (4) the mattress 50, or (5) the mattress band 110', or (6) the mattress covering strip portion 133.

EXAMPLES

Example 1—Preparation of Accessories

Accessories 300, such as those shown in FIGS. 1A-15 and described above in embodiments 1 to 65, were prepared. The resulting accessories 300 were used by attaching a given accessory 300 to (1) the bed sheet retention devices disclosed in International Patent Application No. PCT/US2023/079473 (i.e., corner brackets 10), (2) the bed sheet retention devices disclosed in U.S. patent application Ser. No. 18/945,224 filed on Nov. 12, 2024 (i.e., corner brackets 10 and side brackets 40), (3) the bed sheet retention devices disclosed in U.S. patent application Ser. No. 18/986,848 filed on Dec. 19, 2024 (i.e., corner brackets 10 and side brackets 40), and (4) the bed sheet retention devices disclosed in U.S. patent application Ser. No. 19/072,092 filed on Mar. 6, 2025 (i.e., corner brackets 10, side brackets 40, mattress covering components 110, mattress covers 120, mattresses 50, mattress bands 110', and mattress covering strip portion 133), and entitled "BED SHEET RETENTION SYSTEMS, SYSTEM COMPONENTS, AND METHODS OF MAKING AND USING THE SAME," the subject matter of all of which is hereby incorporated in its entirety, so as to position at least a portion of the accessory 300 (i) above the one or more sheet-engaging channels 12, and/or (ii) below the one or more sheet-engaging channels 12, and/or (iii) within a horizontal plane P containing the one or more sheet-engaging channels 12.

It should be understood that although the above-described attachable accessories, bed sheet retention systems, and/or methods are described as "comprising" one or more components or steps, the above-described attachable accessories, bed sheet retention systems, and/or methods may "comprise," "consists of," or "consist essentially of" any of the above-described components, features, or steps of the attachable accessories, bed sheet retention systems, and/or methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains," "containing," "characterized by" or any other variation thereof, are intended to encompass a non-exclusive inclusion, subject to any limitation explicitly indicated otherwise, of the recited components. For example, an attachable accessory, bed sheet retention system, and/or method that "comprises" a list of elements (e.g., components, features, or steps) is not necessarily limited to only those elements (or components or steps), but may include other elements (or components or steps) not expressly listed or inherent to the accessory, bed sheet retention system, and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define an accessory, bed sheet retention system, and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of."

Further, it should be understood that the herein-described attachable accessories, bed sheet retention systems, and/or methods may comprise, consist essentially of, or consist of any of the herein-described components and features, as shown in the figures with or without any feature(s) not shown in the figures. In other words, in some embodiments, the attachable accessories, bed sheet retention systems, and/or methods of the present invention do not have any additional features other than those shown in the figures, and such additional features, not shown in the figures, are specifically excluded from the attachable accessories, bed sheet retention systems, and/or methods. In other embodiments, the attachable accessories, bed sheet retention systems, and/or methods of the present invention do have one or more additional features that are not shown in the figures.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An accessory capable of connecting to one or more sheet-engaging channels of a bed sheet retention device, said accessory comprising:
    (a) at least one accessory connecting member, and
    (b) an accessory body connected to and extending from the at least one accessory connecting member,
    wherein the at least one accessory connecting member comprises an upwardly-extending upper-edge connecting member, and a downwardly-extending lower-edge connecting member opposite the upwardly-extending upper-edge connecting member, wherein the upwardly-extending upper-edge connecting member, and the downwardly-extending lower-edge connecting member are both within a vertically-extending plane P that is parallel with a rear surface of the accessory body, and
    wherein said accessory body comprises an accessory channel extending (i) within said accessory body from a first outer side edge surface of said accessory body to an opposite second outer side edge surface of said accessory body, (ii) across a length $L_{AB}$ of the accessory body, and (iii) parallel with the vertically-extending plane P;
    further comprising a scented strip that is sized and designed to extend within said accessory channel.

2. The accessory of claim 1, wherein the at least one accessory connecting member extends within and connects to the one or more sheet-engaging channels of (1) a corner bracket, (2) a side bracket, (3) a mattress covering component, (4) a mattress cover, (5) a mattress, (6) a mattress band, or (7) a mattress covering strip portion so as to position at least a portion of said accessory body (i) above the one or more sheet-engaging channels, (ii) below the one or more sheet-engaging channels, (iii) within a horizontal plane $P_H$ containing the one or more sheet-engaging channels, or (iv) any combination of (i) to (iii).

3. The accessory of claim 1, wherein said at least one accessory connecting member comprises two accessory connecting members with one accessory connecting member providing the upwardly-extending upper-edge connecting member, and the other accessory connecting member providing the downwardly-extending lower-edge connecting member.

4. The accessory of claim 1, wherein said accessory body comprises an outer surface opposite said at least one accessory connecting member, said outer surface having one or more holes therein, and wherein said one or more holes extend from said outer surface to an inner surface of said accessory channel.

5. The accessory of claim 1, wherein said accessory channel comprises one or more channel surface undulations along one or both opposing inner surfaces of said accessory channel.

6. The accessory of claim 1, wherein said scented strip is (i) coated with a scent-producing or scent-providing material, (ii) impregnated with the scent-producing or the scent-providing material, or (iii) coated and impregnated with the scent-producing or the scent-providing material.

7. An accessory capable of connecting to one or more sheet-engaging channels of a bed sheet retention device, said accessory comprising:
    (a) at least one accessory connecting member, and
    (b) an accessory body connected to and extending from the at least one accessory connecting member,
    wherein the at least one accessory connecting member comprises an upwardly-extending upper-edge connecting member, and a downwardly-extending lower-edge connecting member opposite the upwardly-extending upper-edge connecting member,
    wherein the upwardly-extending upper-edge connecting member, and the downwardly-extending lower-edge connecting member are both within a vertically-extending plane P that is parallel with a rear surface of the accessory body,
    said accessory comprising a scented component or a scent-generating component that provides a scent in an area near the accessory body,
    wherein said accessory body comprises an accessory channel extending (i) within said accessory body from a first outer side edge of said accessory body to an opposite second outer side edge of said accessory body, (ii) across a length $L_{AB}$ of the accessory body, and (iii) parallel with the vertically-extending plane P, and
    wherein said scented component or the scent-generating component comprises a scented strip that is sized and designed to extend within said accessory channel.

8. The accessory of claim 7, wherein said at least one accessory connecting member comprises two accessory connecting members extending from the rear surface of the accessory body with one of the two accessory connecting members providing the upwardly-extending upper-edge connecting member, and the other of the two accessory connecting members providing the downwardly-extending lower-edge connecting member.

9. The accessory of claim 8, wherein each of the two accessory connecting members comprises a curved connecting member having an arc of curvature along the curved connecting member of about 90 degrees.

10. The accessory of claim 8, wherein an upper edge end of the upwardly-extending upper-edge connecting member, and a lower edge end of the downwardly-extending lower-edge connecting member are separated from one another by a distance $W_{CSC}$, and the distance $W_{CSC}$ is less than an overall height of a channel track profile within a sheet-engaging channel.

11. The accessory of claim 10, wherein the distance $W_{CSC}$ is greater than a distance $D_{CM}$ between (i) an uppermost portion of one or more intermediate connecting members, and (ii) a lowermost portion of the one or more intermediate connecting members, the one or more intermediate connecting members connecting the accessory body to the at least one accessory connecting members.

12. The accessory of claim 10, wherein the distance $W_{CSC}$ ranges from about 0.1 in to about 1.5 in, and each of the two accessory connecting members has a thickness $T_{CSC}$ of from about 0.05 in to about 3.0 in, and an accessory connecting member length $L_{CSC}$ of from about 2.0 in to about 18.0 in.

13. The accessory of claim 12, wherein the distance $W_{CSC}$ ranges from about 0.8 in to about 1.2 in, and each of the two accessory connecting members has the thickness $T_{CSC}$ of from about 0.05 in to about 0.65 in, and the accessory connecting member length $L_{CSC}$ of from about 4.0 in to about 12.0 in.

14. The accessory of claim 7, in combination with the bed sheet retention device, said bed sheet retention device comprising (1) a corner bracket, (2) a side bracket, (3) a mattress covering component, (4) a mattress cover, (5) a mattress, (6) a mattress band, or (7) a mattress covering strip portion.

15. The accessory of claim 14, wherein the one or more sheet-engaging channels of (1) the corner bracket, (2) the side bracket, (3) the mattress covering component, (4) the mattress cover, (5) the mattress, (6) the mattress band, or (7) the mattress covering strip portion, comprise a channel track profile that (A) extends along a length of the one or more sheet-engaging channels, and (B) has a channel track profile height $H_{TP}$ is greater than a channel track profile width $W_{TP}$.

16. An accessory capable of connecting to a surface proximate to or on a bed mattress, said accessory comprising:
(a) at least one accessory connecting member, and
(b) an accessory body connected to and extending from the at least one accessory connecting member,
wherein the at least one accessory connecting member is (1) designed to connect to one or more sheet-engaging channels of a bed sheet retention device, and (2) comprises an upwardly-extending upper-edge connecting member, and a downwardly-extending lower-edge connecting member opposite the upwardly-extending upper-edge connecting member, the upwardly-extending upper-edge connecting member, and the downwardly-extending lower-edge connecting member both being within a vertically-extending plane P,
said accessory body comprises an accessory channel having an accessory channel track profile that extends (i) along a length $L_{AB}$ of the accessory body from a first outer side edge surface of said accessory body to an opposite second outer side edge surface of said accessory body, and (ii) parallel with the vertically-extending plane P, said accessory channel being sized and designed to accept a scented component or scent-generating component therethrough.

17. The accessory of claim 16, further comprising a scented strip that is sized and designed to extend within said accessory channel.

18. The accessory of claim 17, in combination with the bed sheet retention device, said bed sheet retention device comprising (1) a corner bracket, (2) a side bracket, (3) a mattress covering component, (4) a mattress cover, (5) a mattress, (6) a mattress band, or (7) a mattress covering strip portion.

* * * * *